US008803675B2

(12) United States Patent
Ishibashi

(10) Patent No.: US 8,803,675 B2
(45) Date of Patent: Aug. 12, 2014

(54) DISPLAY APPARATUS FOR VEHICLE

(75) Inventor: Shuichi Ishibashi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 171 days.

(21) Appl. No.: 13/113,373

(22) Filed: May 23, 2011

(65) Prior Publication Data

US 2011/0285525 A1 Nov. 24, 2011

(30) Foreign Application Priority Data

May 24, 2010 (JP) ................................ 2010-118408

(51) Int. Cl.
*B60Q 1/00* (2006.01)

(52) U.S. Cl.
USPC ............................ 340/438; 340/461; 340/462

(58) Field of Classification Search
USPC ............. 340/425.5, 431, 433–434, 438, 459, 340/461; 701/1, 29.1, 29.4, 428, 431, 444
See application file for complete search history.

(56) References Cited

U.S. PATENT DOCUMENTS

| | | | | |
|---|---|---|---|---|
| 2004/0172182 | A1* | 9/2004 | Pathare | 701/36 |
| 2005/0154505 | A1* | 7/2005 | Nakamura et al. | 701/1 |
| 2005/0278091 | A1* | 12/2005 | Burnham et al. | 701/36 |
| 2007/0085708 | A1* | 4/2007 | Kato et al. | 340/995.1 |
| 2008/0048930 | A1* | 2/2008 | Breed | 345/7 |
| 2008/0252439 | A1* | 10/2008 | Yamamoto et al. | 340/461 |
| 2008/0309474 | A1* | 12/2008 | Okamoto et al. | 340/462 |
| 2009/0167515 | A1* | 7/2009 | Scherzinger et al. | 340/438 |
| 2009/0171529 | A1* | 7/2009 | Hayatoma | 701/36 |
| 2009/0179745 | A1* | 7/2009 | Okamoto et al. | 340/425.5 |
| 2009/0278677 | A1* | 11/2009 | Arie et al. | 340/461 |

FOREIGN PATENT DOCUMENTS

| | | | |
|---|---|---|---|
| JP | 6-231604 | A | 8/1994 |
| JP | 2002-104018 | A | 4/2002 |
| JP | 2003-291688 | A | 10/2003 |
| JP | 2005-059660 | A | 3/2005 |
| JP | 2007-51919 | A | 3/2007 |
| JP | 2007-87337 | A | 4/2007 |
| JP | 2007-199026 | A | 8/2007 |
| JP | 2008-1120 | A | 1/2008 |

OTHER PUBLICATIONS

Office Action dated Mar. 4, 2014 issued by the Japanese Patent Office in counterpart Japanese Patent Application No. 2010-118408.

* cited by examiner

*Primary Examiner* — Hai Phan
*Assistant Examiner* — Orlando Bousono
(74) *Attorney, Agent, or Firm* — Sughrue Mion, PLLC

(57) ABSTRACT

A display apparatus for vehicle includes: a first display unit which is provided in a region within a horizontal width of a steering wheel when viewed from a driver, and which displays at least single piece of notification information regarding a state of the vehicle; a second display unit which is integrally formed with the first display unit, and which displays information in a region outside the horizontal width of the steering wheel when viewed from the driver; and a control unit which controls image-display on the first display unit and the second display unit. The second display unit includes an information-image display region which displays an information-image corresponding to the at least single piece of notification information, and a guide display region which displays a guide-image for guiding a driver's eye to a side of the information-image display region.

4 Claims, 13 Drawing Sheets

30
31
73a
73b
ICON A
ICON B
ICON C
ICON D
72a
72b
72c
72d

DISPLAY APPARATUS FOR VEHICLE

BACKGROUND OF THE INVENTION

1. Technical Field

The present invention relates to a display apparatus for vehicle for displaying notification information regarding a state of the vehicle.

2. Background Art

In the past, as a display apparatus for vehicle for displaying notification information regarding a state of the vehicle, there has been proposed, for example, a display apparatus for a vehicle described in JP-A-2008-1120. The display apparatus for vehicle includes a center display which displays information indicating a state of the vehicle such as a speed of the vehicle, and a sub display which displays information which differs from the information displayed in the center display.

The sub display includes a right-side display and a left-side display. The right-side display displays information indicating a state in which a preceding vehicle is detected and follow-up driving is performed, or the like. The left-side display displays a map which indicates a current location of the vehicle or the like.

A driver is notified of display states of the right-side display and the left-side display by displaying an icon corresponding to the display states of the right-side display and the left-side display on the center display.

When the display states of the right-side display and the left-side display are changed, since the icon blinks on and off on the center display, the driver can see the display state of the icon. Thus, the driver can check whether the display states of the right-side display and the left-side display are changed or not.

In the above-mentioned display apparatus for vehicle, however, although the driver can check whether the display state of the sub display is changed or not, there is a problem that the driver's eye is not guided to the sub display, and the visibility of the information displayed on the sub display is lowered.

Moreover, in the above-mentioned display apparatus for vehicle, when the notification information regarding the state of the vehicle is displayed on the center display, the information which differs from the information displayed on the center display is displayed on the sub display. Thus, the driver hardly understands the content of the notification information which is displayed on the center display.

SUMMARY OF THE INVENTION

The present invention is achieved in order to solve the problems as mentioned above, and its object is to provide a display apparatus for vehicle capable of enhancing a visibility of information image regarding notification information to cause a driver to surely understand the content of the notification information.

There is provided a display apparatus for vehicle including: a first display unit which is provided in a region within a horizontal width of a steering wheel when viewed from a driver, and which displays at least single piece of notification information regarding a state of the vehicle; a second display unit which is integrally formed with the first display unit, and which displays information in a region outside the horizontal width of the steering wheel when viewed from the driver; and a control unit which controls image-display on the first display unit and the second display unit. The second display unit includes an information-image display region which displays an information-image corresponding to the at least single piece of notification information, and a guide display region which displays a guide-image for guiding a driver's eye to a side of the information-image display region.

According to the display apparatus for vehicle, since the guide-image for guiding the driver's eye toward the information-image display region of the second display unit is displayed, the driver's eye is guided to the information-image display region. Thus, it is possible to enhance the visibility of the information image which corresponds to the notification information which has been displayed on the information-image display region.

Further, since the information-image display region of the second display unit displays the information image corresponding to the notification information, the driver's eye can be guided to the information-image display region. Thus, the driver can surely understand the content of the notification information displayed on the first display unit.

Accordingly, it is possible to provide a display apparatus for vehicle capable of enhancing the visibility of the information-image regarding the notification information, and causing the driver to surely understand the content of the notification information.

DETAILED DESCRIPTION OF THE EXEMPLARY EMBODIMENTS

Figure 1:
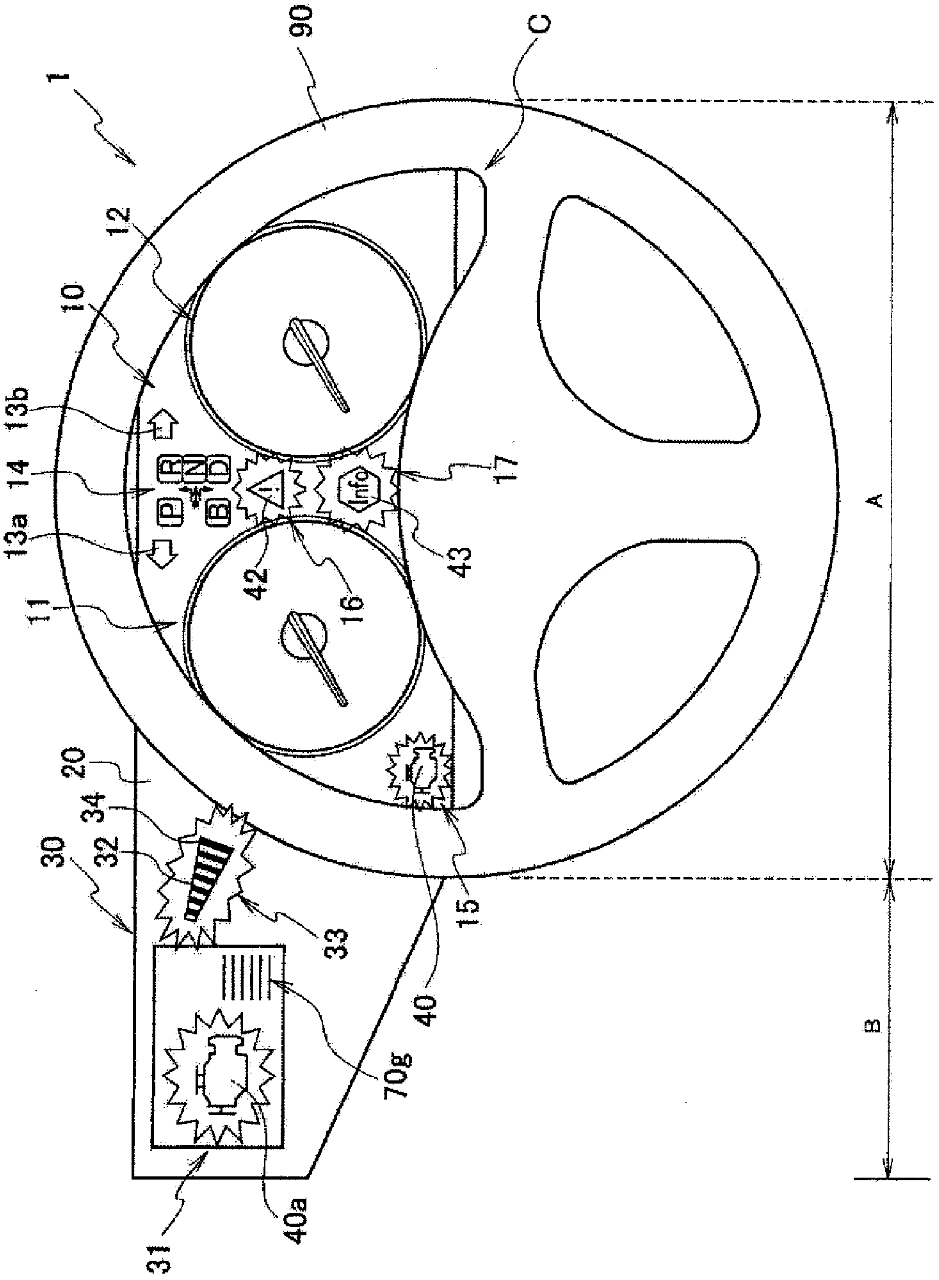
FIG. 1 shows a positional relationship between a steering wheel and a display apparatus for vehicle according to an embodiment of the invention.

According to a first aspect of the invention, there is provided a display apparatus for vehicle including: a first display unit which is provided in a region within a horizontal width of a steering wheel when viewed from a driver, and which displays at least single piece of notification information regarding a state of the vehicle; a second display unit which is integrally formed with the first display unit, and which displays information in a region outside the horizontal width of the steering wheel when viewed from the driver; and a control unit which controls image-display on the first display unit and the second display unit, and the second display unit includes an information-image display region which displays an information-image corresponding to the at least single piece of notification information, and a guide display region which displays a guide-image for guiding a driver's eye to a side of the information-image display region.

In a second aspect, the display apparatus may be configured so that the guide display region is located between the first display unit and the information-image display region.

In a third aspect, the display apparatus may be configured so that the guide display region has an elongated shape extending from a side of the first display unit to a side of the information-image display region, and the control unit lights the guide display region when the control unit causes the first display to display the notification information.

In a fourth aspect, the display apparatus may be configured so that the control unit lights the guide display region so as to gradually lengthen the lighting time of the guide display region from a side of the first display toward the information-image display region when the control unit causes the first display to display the notification information.

In a fifth aspect, the display apparatus may be configured so that a plurality of pieces of notification information correspond to respective display colors, which differ from one another in color, and when the control unit causes the first display to display one of the plurality of pieces of the notification information, the control unit lights the guide display region with a display color corresponding to the one notification information.

According to the display apparatus of the first aspect of the invention, since the guide-image for guiding the driver's eye toward the information-image display region of the second display unit is displayed, the driver's eye is guided to the information-image display region. Thus, it is possible to enhance the visibility of the information image which corresponds to the notification information which has been displayed on the information-image display region.

Further, since the information-image display region of the second display unit displays the information image corresponding to the notification information, the driver's eye can be guided to the information-image display region. Thus, the driver can surely understand the content of the notification information displayed on the first display unit.

Accordingly, it is possible to provide a display apparatus for vehicle capable of enhancing the visibility of the information-image regarding the notification information, and causing the driver to surely understand the content of the notification information.

According to the display apparatus of the second aspect of the invention, since the guide display region is located between the first display unit and the information-image display region, the guide display region comes into the sight of the driver. Thus, it is possible to guide the driver's eye to the information-image display region.

According to the display apparatus of the third aspect of the invention, when the notification image is displayed on the first display unit, the guide display region having the elongated shape extending from a side of the first display unit toward the information-image display region is lightened. Thus, it is possible to guide the driver's eye more to the information-image display region.

According to the display apparatus of the fourth aspect of the invention, the guide display region is lightened so as to gradually lengthen the lighting time of the guide display region from a side of the first display unit toward the information-image display region. Thus, the driver's eye can be likely guided to the information-image display region.

According to the display apparatus of the fifth aspect of the invention, when the notification image is displayed on the first display unit, the guide display region is lightened in the display color corresponding to the displayed notification information. Thus, the guide display region which lights in the display color corresponding to the notification information comes into the sight of the driver. The driver can understand the kind of the notification information and view the information-image.

Embodiment

A description is made of an embodiment of the invention with reference to accompanying drawings. First, a description is made of a positional relationship between a steering wheel (a steering handle) and a display apparatus for vehicle according to the embodiment of the invention. FIG. 1 shows a positional relationship between the steering wheel and the display apparatus for vehicle according to the embodiment of the invention.

As shown in FIG. 1, a display apparatus 1 for vehicle includes a liquid crystal display. The display apparatus 1 for vehicle is substantially constituted by a first display (a first display unit) 10 which displays at least single piece of notification information (for example, information such as an alert, a suggestion, vehicle information, or a dialogue detail) regarding a state of the vehicle, and a second display (a second display unit) 30 which is integrally formed with the first display 10.

As shown in FIG. 1, the first display 10 is provided in a region A within a horizontal width of a steering wheel 90 when viewed from a driver. The second display 30 is provided in a region B outside the horizontal width of the steering wheel 90 when viewed from the driver. In other words, the second display 30 is provided at an upper side (a front glass side) of the first display 10, and extends toward an outer direction from a region C which is surrounded by the steering wheel 90.

In this way, since the second display 30 is provided in the region B outside the horizontal width of the steering wheel 90, an image displayed on the second display 30 is not hidden by the steering wheel 90. Thus, the visibility of the second display 30 is enhanced.

The first display 10 and the second display 30 adopt a structure in which they are integrally formed with each other, and a single front glass 20 is disposed in front of the first display 10 and the second display 30. In this way, since the first display 10 and the second display 30 adopt the integral structure, a coordinate and cooperated image between the first display 10 and the second display 30 can be displayed.

Figure 2:
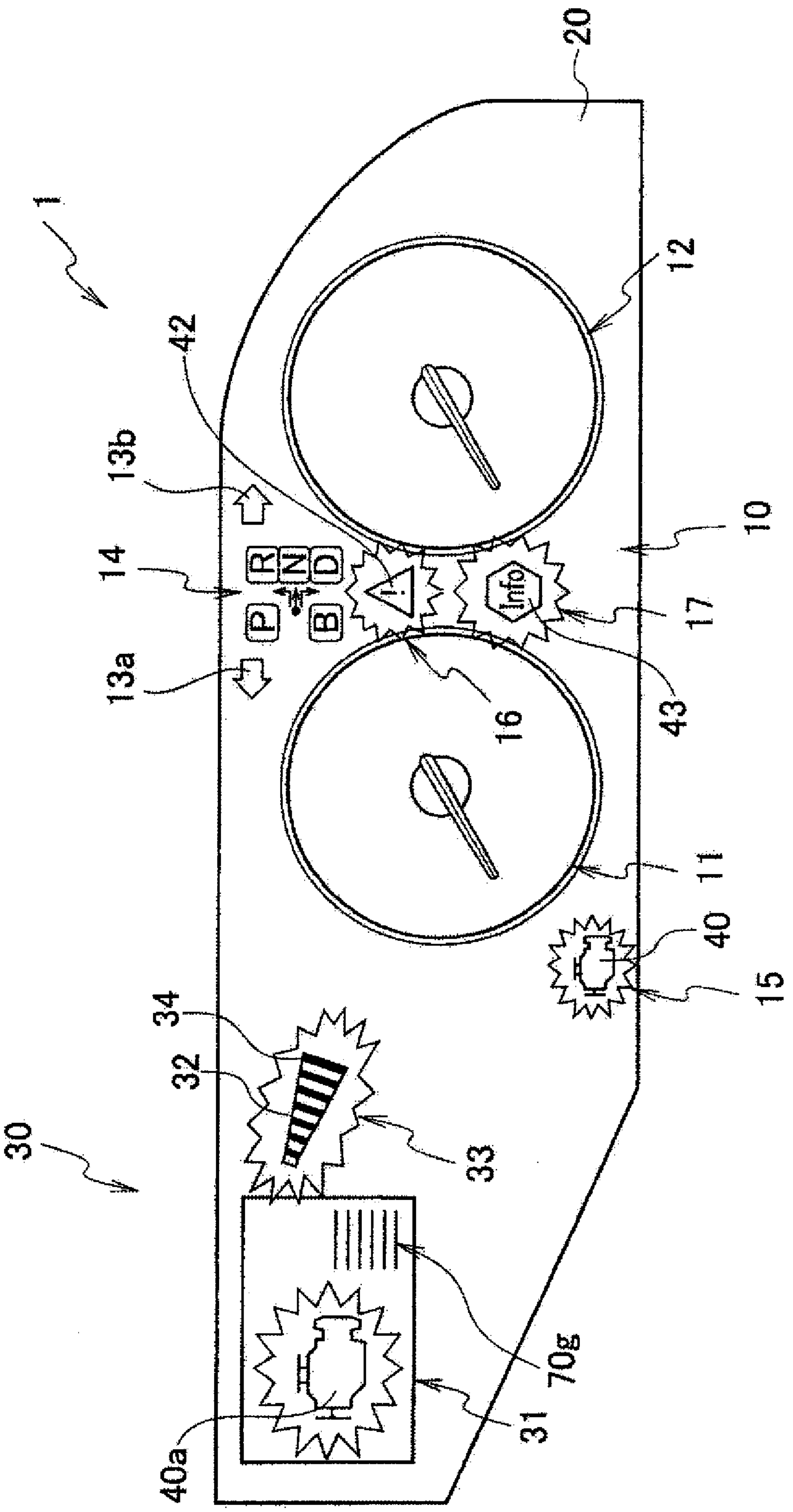
FIG. 2 is a plan view of the display apparatus for vehicle according to the embodiment of the invention.

Next, a detailed description is made of the display apparatus 1 for vehicle according to the embodiment of the invention with reference to FIG. 2. FIG. 2 is a plan view of the display apparatus for vehicle according to the embodiment of the invention.

The first display 10 which displays notification information regarding the state of the vehicle (for example, information such as an alert, a suggestion, vehicle information, or content of a dialogue) includes a speed meter 11 which displays a driving speed of an automobile, a tachometer 12 which displays a rotational speed of an engine, a direction indicator 13*a* for a right blinker and a direction indicator 13*b* for a left blinker which are disposed at the upper side of the speed meter 11 and the tachometer 12, and a shift indicator display 14 which is provided between the speed meter 11 and the tachometer 12, and displays the shift position of a transmission.

The first display 10 includes a plurality of display sections which display the notification information regarding the state of the vehicle (for example, information such as an alert, a suggestion, vehicle information, or content of a dialogue). Specifically, the first display 10 includes an alert and alarm display section 15 which displays an alert symbol 40 which indicates an alert such as an abnormality in the electronic control of the engine and an alarm symbol 41 which indicates an alarm such as an abnormality in the air-bag system (see FIG. 10 as described later), a master caution display section 16 which displays a master caution symbol 42 which indicates the occurrence of the abnormality in the vehicle when the alert symbol 40 and the alarm symbol 41 are displayed on the alert and alarm display section 15, and an indicator and information display section 17 which displays an indicator symbol (not shown in figures) which indicates a maintenance message for the vehicle, or the like and an information symbol 43 which indicates the information of the vehicle, or the like.

For example, the alert and alarm display section 15 displays symbols 40, 41, 42 which correspond to the alert and the alarm regarding the state of the vehicle, such as the abnormality in the electronic control of the engine, the abnormality in the air-bag system, and an alert of a half-shut state and seatbelt sign.

The second display 30 includes an information-image display region 31 which displays an information-image corresponding to the notification information such as the abnormality in the electronic control of the engine, the abnormality in the air-bag system, and an alert of a half-shut state and seatbelt sign, and a guide-image display region 33 which displays a guide-image 32 for guiding a driver's eye to a side of the information-image display region 31.

When the first display 10 displays the notification information of the alert symbol 40, the alarm symbol 41, the indicator symbol (not shown in figures), or the information symbol 43, the information-image display region 31 displays an information-image which corresponds to the notification information displayed on the first display 10. Specifically, the information-image display region 31 displays an alert image corresponding to the notification information, an alarm image corresponding to the alarm information, a dialogue image which indicates a maintenance message of the vehicle, etc., a notice image which indicates the information of the vehicle, and the like.

For example, as shown in FIG. 2, when the alert and alarm display section 15 of the first display 10 displays the alert symbol 40 which indicates the abnormality in the electronic control of the engine, the image display region 31 displays an alert symbol 40*a* same as the symbol displayed on the alert and alarm display section 15 and an text image 70*g* for explaining the content of the notification information (e.g., a sentence for explaining that the abnormality in the electronic control of the engine occurs).

Further, when the first display 10 does not display the symbols 40, 41, 43, the information-image display region 31 displays an icon image (see FIG. 12 as described later) for selecting an image to be displayed on the second display 30, and then displays the image selected from the icon image (e.g., an rear image of the vehicle which is picked up by a camera, or a navigation image which indicates a present location of the vehicle and a route of the destination).

The guide-image display region 33 includes a plurality of guide lights 34, and lights or blinks the plurality of guide lights 34 to display a guide-image 32. In this case, the guide-image display region 33 may be configured so that the guide lights 34 light so as to gradually lengthen the lighting time of the guide lights 34 from a side of the first display 10 toward the information-image display region 31. Further, the guide-image display region 33 may repeat a scroll lighting in which the plurality of guide lights 34 light in an order from a side of the first display 10 toward the information-image display region 31.

In this way, since the guide-image 32 for guiding the driver's eye toward the information-image display region 31 of the second display 30 is displayed, the driver's eye is guided to the information-image display region 31. Thus, it is possible to enhance the visibility of the information image (such as an alert image, an alarm image, a dialogue image, or a notice image) which corresponds to the notification information which has been displayed on the information-image display region 33.

Since the information-image display region 31 of the second display 30 displays the information image corresponding to the notification information (see FIG. 10 as described later), the driver can surely understand the content of the alert symbol 40, the alarm symbol 41, or the like which is displayed on the alert and alarm display section 15 of the first display 10.

Accordingly, it is possible to provide a display apparatus 1 for vehicle capable of enhancing the visibility of the information-image regarding the notification information by guiding the driver's eye, and causing the driver to surely understand the content of the notification information.

Since the guide display region 33 is located between the first display 10 and the information-image display region 31, the guide display region 33 comes into the sight of the driver. Thus, it is possible to guide the driver's eye to the information-image display region 31.

Figure 3:
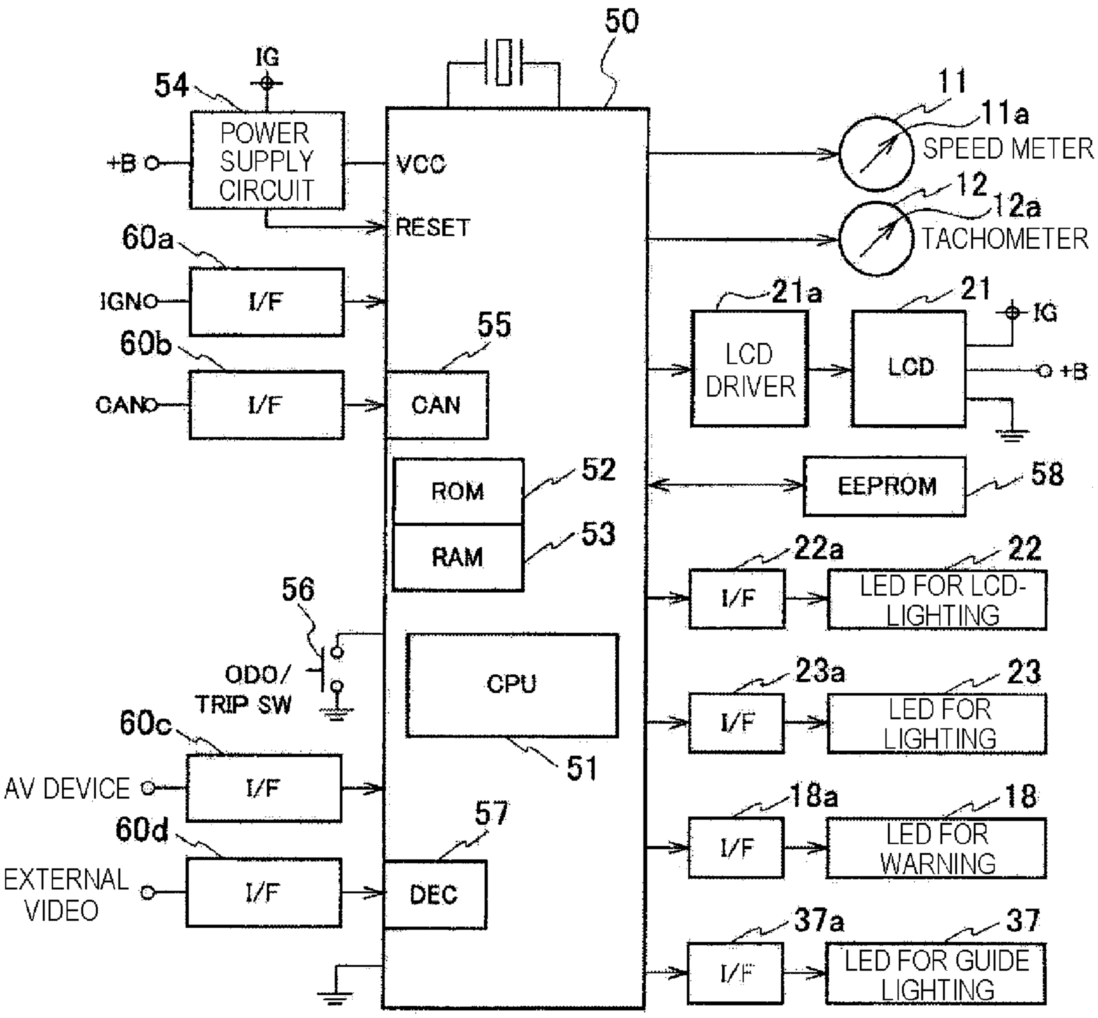
FIG. 3 is a block diagram showing a circuit configuration of the display apparatus for vehicle according to the embodiment of the invention.

Next, a description is made of the configuration of a circuit included in the display apparatus 1 for vehicle according to the embodiment of the invention with reference to FIG. 3. FIG. 3 is a block diagram showing a configuration of a control circuit of the display apparatus for vehicle according to the embodiment of the invention.

As shown in FIG. 3, a control circuit 50 (an image display control unit) includes a CPU (Central Processing Unit) 51, a ROM (Read Only Memory) 52 and a RAM (Random Access Memory) 53. The control circuit 50 is provided inside the display apparatus 1 for vehicle.

The CPU 51 controls a display of the image on the first display 10 and the second display 30, an output of the sound to a speaker (not shown in figures), and the like, in accordance with a signal output from various sensors provided in each section of the vehicle.

A control program to be executed by the CPU 51, image data to be displayed on the first display 10 and the second display 30, and the like are stored in the ROM 52. Various data such as image data and sound data decided by the execution of the control program are stored in the RAM 53.

To the control circuit 50 are connected a power supply circuit 54 which is connected to a battery B and supplies an appropriate power supply voltage to the CPU 51, an ignition (IGN) which is connected through an I/F (an interface) 60*a* and generates a predetermined voltage, and a CAN (Controller Area Network) which is connected through an I/F 60*b* for inputting various signals which indicate detection of the state of the vehicle. The various detection signals (e.g., a signal indicating an abnormality in the electronic control of the engine, or a signal indicating an abnormality of the air-bag system) input through the I/F 60*b* are received by a CAN communication section 55.

The CPU 51 discriminates an alert signal and an alarm signal which indicate an abnormality of the vehicle, a dialogue signal which indicates a maintenance of the vehicle, or the like, or an information signal which indicates information of the vehicle, or the like, in accordance with one or more signals received by the CAN communication section 55 or received signals within a predetermined time period.

Further, to the control circuit 50 connected are a switch 56 (SW) for resetting a driving distance meter (ODO/TRIP) including an accumulated driving distance of an odometer or a trip-meter, an AV device which is connected through an I/F 60*c* for inputting signals indicating audio information, etc., and an external video which is connected through an I/F 60*d* for inputting a rear image of the vehicle picked up by a camera disposed outside the vehicle, and the like. The signal input from the external video is output to a DEC (a decoder) 57.

Moreover, to the control circuit 50 connected are a speed meter 11, a tachometer 12, an LCD (Liquid Crystal Display) 21, an EEPROM (Electrically Erasable and Programmable ROM) 58, an LED 22 for LCD-lighting, an LED 23 for lighting, an LED 18 for warning, and an LED 37 for guide lighting, which are operated by the CPU 51.

Pointers 11*a*, 12*a* of the speed meter 11 and the tachometer 12 are controlled in rotation in accordance with a signal indicating a driving speed or a signal indicating a rotation of the engine which is received by the CAN communication section 55. Further, it may be configured so that image data is generated in accordance with the signal indicating the driving speed or the signal indicating the rotation of the engine, and the generated image data is displayed on the first display 10 as a speed meter or a tachometer.

The LCD 21 is connected to the control circuit 50 through the LCD driver 21*a*. Display signals of various information output from the CPU 51 are input to the LCD driver 21*a*, and the LCD driver 21*a* performs a drawing process, etc. and outputs an image display signal to the LCD 21 of the display apparatus 1 for vehicle.

Various data is stored in the EEPROM 58. The various data includes symbol display color pattern data which defines a display color for each symbol (such as an alert symbol 40, an alarm symbol 41, an information symbol 43) to be displayed on the alert and alarm display section 15, and the indicator and information display section 17 of the first display 10, information-image data which is defined in correspondence with the symbols 40, 41, 43 to be displayed on the first display 10, guide display color pattern data which displays a display color of the guide image region 33 in correspondence with each symbol 40, 41, 43 to be displayed on the first display 10, and background color pattern data which defines a background color to be displayed on the second display 30 in correspondence with each symbol to be displayed on the first display 10.

The LED 22 for LCD-lighting is connected to the control circuit 50 through an I/F 22*a*. The LED 23 for lighting is connected to the control circuit 50 through an I/F 23*a*. The LED 22 for LCD-lighting and the LED 23 for lighting light at all times during the power supply to the display apparatus 1 for vehicle.

The LED 18 for warning is connected to the control circuit 50 through an I/F 18*a*, and lights or blinks in a display color corresponding to the state of the vehicle in accordance with the signal received by the CAN communication section 55 which indicates the state of the vehicle (e.g., the signal indicating the abnormality in the electronic control of the engine, or the signal indicating the abnormality of the air-bag system).

The LED 37 for guide-lighting is connected to the control circuit 50 through an I/F 37*a*, and lights or blinks in a display color corresponding to a symbol, when the symbol is displayed on the first display (e.g., the alert symbol 40, the alarm symbol 41, or the information symbol 43) in accordance with the signal output from the control circuit 50.

Figure 4:
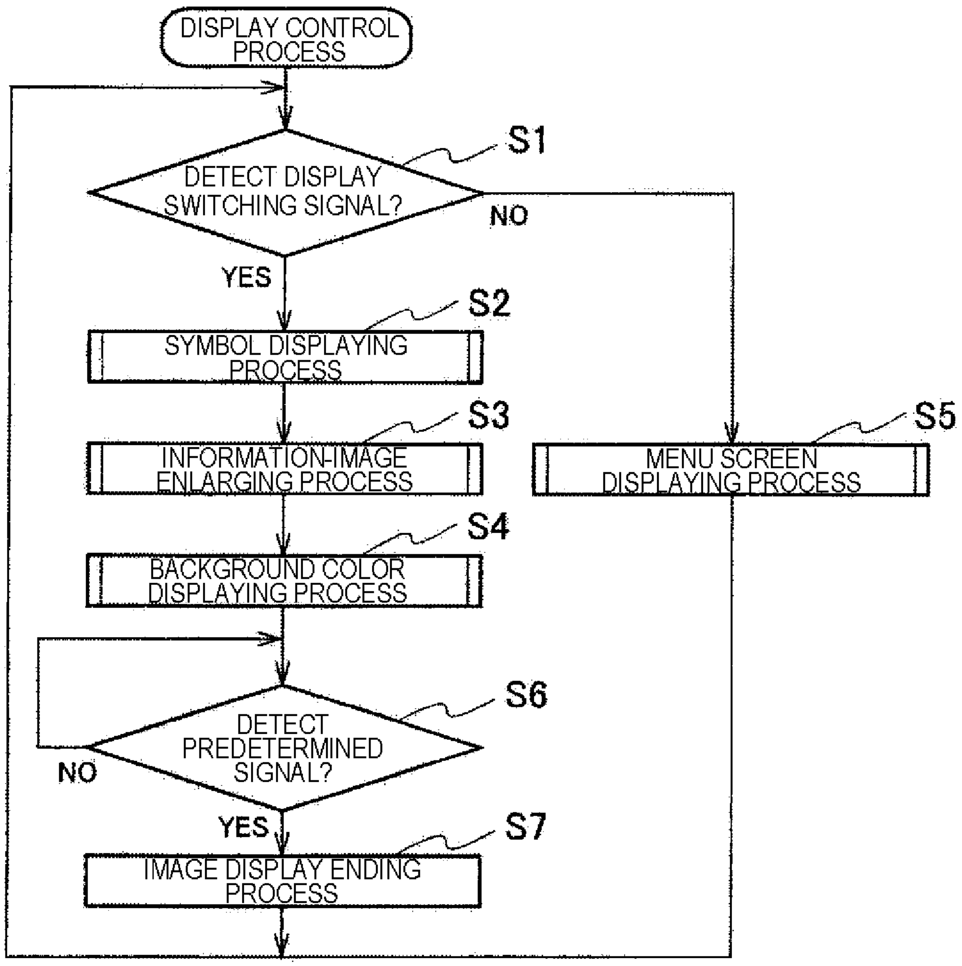
FIG. 4 is a flowchart of a display control process according to the embodiment of the invention.

Next, a description is made of an operation of the display apparatus 1 for vehicle according to the embodiment of the invention with reference to FIG. 4 through FIG. 15C. First, a display control process of the CPU 51 according to the embodiment of the invention is described with reference to FIG. 4. FIG. 4 is a flowchart of the display control process according to the embodiment of the invention.

First, as shown in FIG. 4, the CPU 51 determines whether or not the CPU 51 has received a display switching signal for switching a display of the first display 10 and the second display 30 (step S1). That is, the CPU 51 determines whether or not the CPU 51 has received the signal for displaying the symbols 40, 41, 43 and the information images on the first display 10 and the second display 30, and whether or not the CPU 51 has received the signal for displaying the rear image of the vehicle and the navigation information image input from the AV device and the external video in accordance with the signal received by the CAN communication section 55 which indicates the state of the vehicle (e.g., the signal indicating the abnormality in the electronic control of the engine, the abnormality of the air-bag system, or the like).

When the CPU 51 has determined the CPU 51 has received the display switching signal (step S1: YES), the CPU 51 performs a symbol display process described later with reference to FIG. 5 (step S2). In this process, the CPU 51 displays images corresponding to the display switching signal on the alert and alarm display section 15, the master caution display section 16, and the indicator and information display section 17.

Next, the CPU 51 performs an information-image enlarging process as described later with reference to FIG. 6 (step S3). In this process, the information-image to be displayed on the information-image display region 31 of the second display 30 is enlarged for the time corresponding to the display switching signal.

Next, the CPU 51 performs a background color displaying process as described later with reference to FIG. 9 (step S4). In this process, the background color of the information-image region 31 of the second display 30 is changed to the display color corresponding to the display switching signal.

On the other hand, when the CPU 51 has determined that the CPU 51 has not received the display switching signal (step S2: NO), the CPU 51 performs a menu screen displaying process or an image displaying process before detection of the display switching signal as described later in FIG. 11 and FIG. 13 (step S5). In this process, the display of the menu screen to be displayed on the information-image display region 31 of the second display 30 is changed in accordance with a manipulation of the driver, etc. Further, in the menu screen displaying process, the CPU 51 performs a process for displaying one image selected by the driver, or the like among various images such as a rear image of the vehicle and a navigation information-image.

After the step S4 or the step S5, the CPU 51 determines whether or not the CPU 51 has detected a predetermined signal (step S6). That is, the CPU 51 receives another signal which differs from the signal received in the step S1, and determines whether or not the display of the images displayed on the first display 10 and the second display 30 is finished in order to display other images on the first display 10 and the second display 30.

When the CPU 51 has determined that the CPU 51 has not detected the predetermined signal (step S6: NO), the CPU 51 waits until detection of the predetermined signal (such as another alert or alarm signal, or a signal for releasing the alert or alarm). That is, the CPU 51 continues to display the images displayed on the first display 10 and the second display 30 until the CPU 51 receives another signal which differs from the signal received in the step S1.

On the other hand, when the CPU 51 has determined that the CPU 51 has detected the predetermined signal (step S6: YES), the CPU 51 performs a display end process (step S7), and proceeds with the step S1. That is, when the CPU 51 has received another signal which differs from the signal received in the step S1, the CPU 51 ends the display of the images by undisplaying the images displayed on the first display 10 and the second display 30 in the step S2 through the step S4.

In the step S6, it may be configured so that, when the CPU 51 has determined that the CPU 51 has not detected the predetermined signal, the CPU 51 determines whether or not a display time corresponding to a kind of the notification information (such as the alert symbol 40, the alarm symbol 41, the master caution symbol 42, the indicator symbol (not shown in figure), or the information symbol 43) which is displayed on the first display 10, and then, when the display time corresponding to the kind of the notification information has elapsed, the CPU 51 ends the information-image (such as the alert image, the alarm image, the dialogue image, or the notice image) which is displayed on the second display 30.

Figure 5:
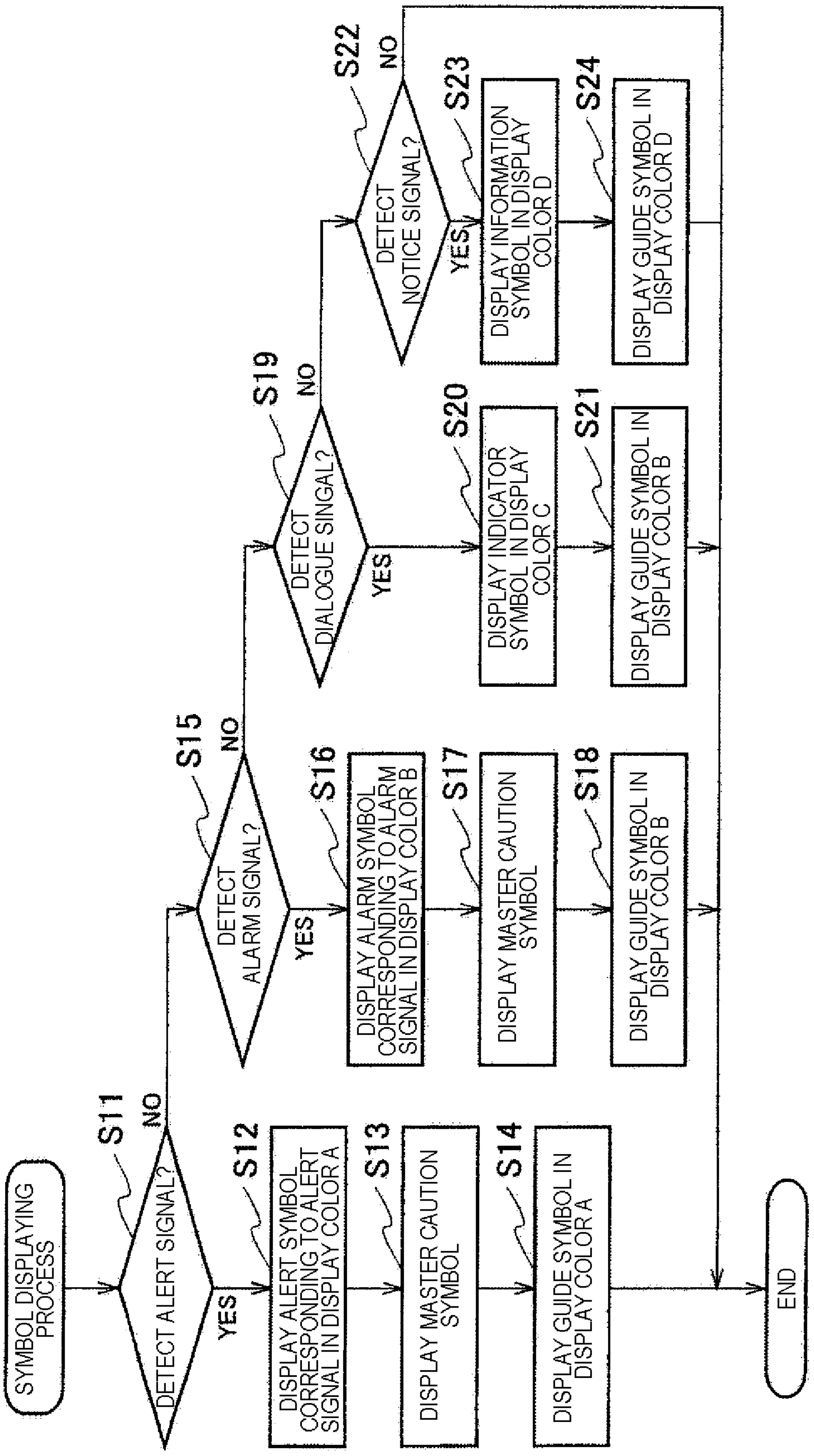
FIG. 5 is a flowchart of a symbol-displaying process according to the embodiment of the invention.

Next, a description is made of a symbol-displaying process of the CPU 51 according to the embodiment of the invention with reference to FIG. 5. FIG. 5 is a flowchart of the symbol-displaying process according to the embodiment of the invention.

First, as shown in FIG. 5, the CPU 51 determines whether the CPU 51 has detected an alert signal which indicates an abnormality of the vehicle in accordance with the signal received by the CAN communication section 55 (step S11). When the CPU 51 has determined that the detected signal is the alert signal which indicates the abnormality of the vehicle (step S11: YES), the CPU 51 displays the alert symbol 40 corresponding to the alert signal (see FIG. 2) in a display color A (step S12). That is, when the detected signal is the alert signal which indicates the abnormality of the vehicle, the CPU 51 displays the alert symbol 40 corresponding to the alert signal on the alert and alarm display section 15 (see FIG. 2) in the display color A (a red color, for example).

Next, the CPU 51 displays the master caution symbol 42 (see FIG. 2) on the master caution display section 16 (step S13), and displays the guide image 32 by lighting or blinking the guide light 34 (see FIG. 2) of the guide-image display region 33 in the display color A (step S14). When this process ends, the CPU 51 ends the symbol-displaying process.

On the other hand, when the CPU 51 has determined that the detected signal is not the alert signal (step S11: NO), the CPU 51 determines whether or not the CPU 51 an alarm signal which indicates an abnormality of the vehicle in accordance with the signal received by the CAN communication section 55 (step S15). When the CPU 51 has determined that the detected signal is the alarm signal which indicates the abnormality of the vehicle (step S15: YES), the CPU 51 displays the alarm symbol 41 (see FIG. 10B as described later) corresponding to the alarm signal in a display color B. That is, when the detected signal is the alarm signal which indicates the abnormality of the vehicle, the CPU 51 displays the alarm symbol 44 corresponding to the received alarm signal on the alert and alarm display section 15 (see FIG. 2) in the display color B (an orange color, for example).

Next, the CPU 51 displays the master caution symbol 42 (see FIG. 2) on the master caution display section 16 (step S17), and displays the guide image 32 by lighting or blinking the guide light 34 (see FIG. 2) of the guide-image display region 33 in the display color B (step S18). When this process ends, the CPU 51 ends the symbol-displaying process.

On the other hand, when the CPU 51 has determined that the detected signal is not the alarm signal (step S15: NO), the CPU 51 determines whether or not the CPU 51 a dialogue signal which indicates a maintenance of the vehicle, etc. in accordance with the signal received by the CAN communication section 55 (step S19). When the CPU 51 has determined that the detected signal is the dialogue signal which indicates the maintenance of the vehicle, etc. (step S19: YES), the CPU 51 displays the indicator symbol (omitted in figures) corresponding to the dialogue signal in a display color C. That is, when the detected signal is the dialogue signal which notifies the driver of the maintenance information, etc., the CPU 51 displays the indicator symbol corresponding to the received dialogue signal on the indicator and information display section 17 (see FIG. 2) in the display color C (a green color, for example).

Next, the CPU 51 displays the guide image 32 by lighting or blinking the guide light 34 (see FIG. 2) of the guide-image display region 33 in the display color C (step S21). When this process ends, the CPU 51 ends the symbol-displaying process.

On the other hand, when the CPU 51 has determined that the detected signal is not the dialogue signal (step S19: NO), the CPU 51 determines whether or not the CPU 51 a notice signal which indicates information of the vehicle, etc. in accordance with the signal received by the CAN communication section 55 (step S22). When the CPU 51 has determined that the detected signal is not the notice signal (step S22: NO), the CPU 51 ends the symbol-displaying process.

On the other hand, when the CPU 51 has determined that the detected signal is the notice signal which indicates the information of the vehicle, etc. (step S22: YES), the CPU 51 displays the information symbol 43 (see FIG. 2) in a display color D. That is, when the detected signal is the notice signal for notifying the driver of the information of the vehicle, etc., the CPU 51 displays the information symbol 43 (see FIG. 2) corresponding to the detected notice signal on the indicator and information display section 17 (see FIG. 2) in the display color D (a blue color, for example).

Next, the CPU 51 displays the guide image 32 by lighting or blinking the guide light 34 (see FIG. 2) of the guide-image display region 33 in the display color D (step S23). When this process ends, the CPU 51 ends the symbol-displaying process.

In this way, in a case where the notification information (such as the symbols 40, 41, 43) is displayed on the first display 10, since the elongated guide display region 33 (see FIG. 2) extending from a side of the first display 10 toward the information-image display region 31 is lighted, the guide display region 33 comes into the sight of the driver. Thus, it is possible to guide the driver's eye to the information-image display region 31.

Further, in the case where the notification information (such as the symbols 40, 41, 43) is displayed on the first display 10, since the guide display region 33 (see FIG. 2) is lighted in the display color corresponding to the displayed notification information, the driver can understand the kind of the notification information, and view the information-image (such as the alert image, the alarm image, the dialogue image, or the notice image).

Figure 6:
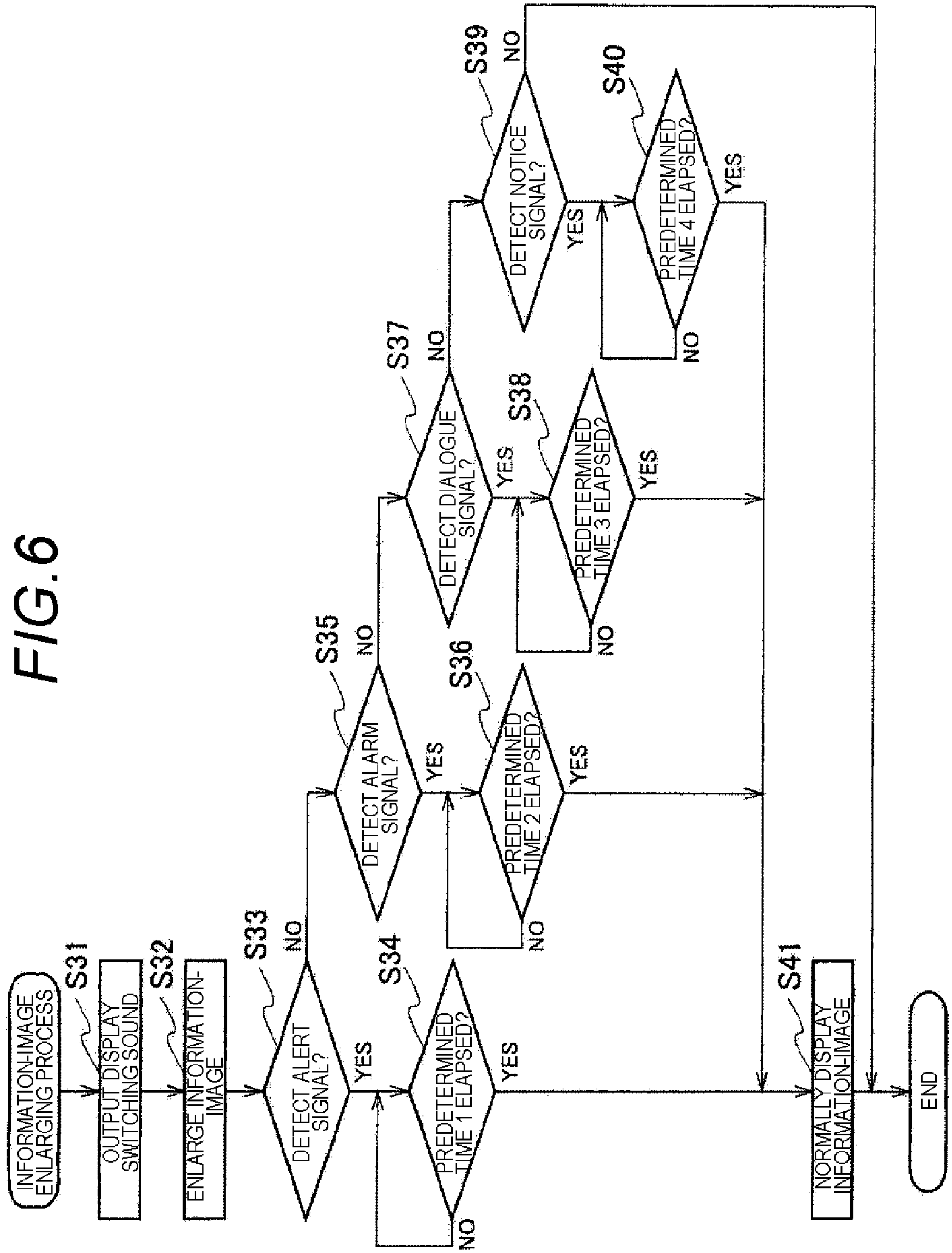
FIG. 6 is a flowchart of an information-image enlarging process according to the embodiment of the invention.
Figure 7A:
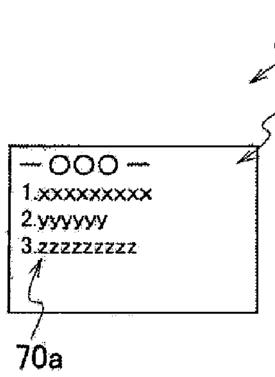
FIGS. 7A to 7C show a screen on which an information-image displayed on a second display according to the embodiment of the invention is enlarged.
Figure 7B:
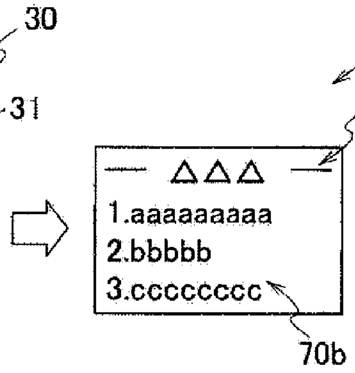
Figure 7C:
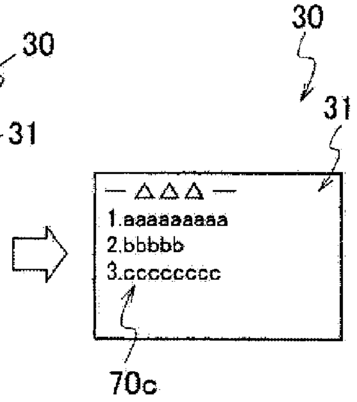
Figure 8A:
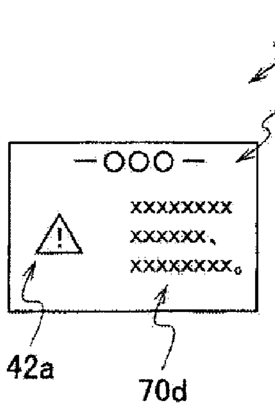
FIGS. 8A to 8C show a screen on which an alert image displayed on the second display according to the embodiment of the invention is enlarged.
Figure 8B:
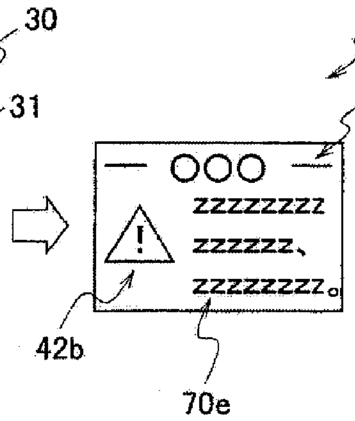
Figure 8C:
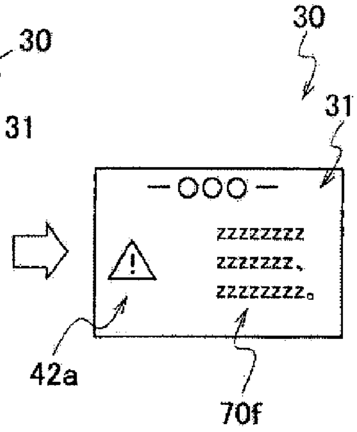

Next, a description is made of an information-image enlarging process of the CPU 51 according to the embodiment of the invention with reference to FIGS. 6 through 8. FIG. 6 is a flowchart of an information-image enlarging process according to the embodiment of the invention. FIG. 7A shows a screen before the information-image displayed on the second display 30 according to the embodiment of the invention is switched. FIG. 7B shows a screen after the information-image displayed on the second display 30 according to the embodiment of the invention is switched and enlarged. FIG. 7C shows a screen after the information-image displayed on the second display 30 according to the embodiment of the invention is switched. FIG. 8A shows a screen before the alert image displayed on the second display 30 according to the embodiment of the invention is switched. FIG. 8B shows a screen after the alert image displayed on the second display 30 according to the embodiment of the invention is switched to another alert image and it is enlarged. FIG. 8C shows a screen after the alert image according to the embodiment of the invention is switched.

First, as shown in FIG. 6, the CPU 51 outputs a display switching sound to a speaker (not shown in figures) (step S31). That is, the CPU 51 outputs a notification sound for notifying the driver that the display on the second display 30 is switched.

Next, the CPU 51 enlarges the information-image (step S32). That is, the CPU 51 enlarges a text-image 70*a* displayed on the information-image display region 31 of the second display 30 as shown in FIG. 7A, to generate text image data corresponding to the display switching signal (see the step S1 in FIG. 4), and displays a text-image 70*b* to be larger than the text image 70*a*. When the information-image is to be enlarged, it may be displayed while gradually increasing the enlargement factor.

Further, in a case, as shown in FIG. 8A, where the display switching signal for switching the display of the second display 30 is an alert signal or an alarm signal which indicates an abnormality of the vehicle, the CPU 51 displays a text-image 70*d* and a master caution symbol 42*a* on the information-image display region 31 of the second display 30. Then, when the received signal is another alert signal or another alarm signal, the CPU 51 generates text image data and master caution symbol image data in an enlargement manner as shown in FIG. 8B. That is, the CPU 51 displays a text-image 70*e* to be larger than the text-image 70*d*, and a master caution symbol 42*b* to be larger than the master caution symbol 42*a*.

Next, the CPU 51 determines whether or not the CPU 51 has detected an alert signal which indicates an abnormality of the vehicle in accordance with the signal received by the CAN communication section 55 (step S33). When the CPU 51 has determined that the detected signal is the alert signal which indicates the abnormality of the vehicle (step S33: YES), the CPU 51 determines whether or not a predetermined time period 1 (forty seconds, for example) has elapsed (step S34). That is, the CPU 51 counts a time from the enlargement process of the information-image with a timer (not shown in figures) and determines whether or not the predetermined time period has elapsed from start of the count.

When the CPU 51 has determined that the predetermined time period 1 has not elapsed (step S33: NO), the CPU 51 waits until the elapse of the predetermined time period 1. On the other hand, when the CPU 51 has determined that the predetermined time period 1 has elapsed (step S33: YES), the CPU 51 proceeds with step S41.

On the other hand, when the CPU 51 has determined that the detected signal is not the alert signal (step S33: NO), the CPU 51 determines whether or not the CPU 51 has detected an alarm signal which indicates an abnormality of the vehicle in accordance with the signal received by the CAN communication section 55 (step S35). When the CPU 51 has determined that the detected signal is the alarm signal which indicates the abnormality of the vehicle (step S35: YES), the CPU 51 determines whether or not a predetermined time period 2 (thirty seconds, for example) has elapsed (step S36).

When the CPU 51 has determined that the predetermined time period 2 has not elapsed (step S36: NO), the CPU 51 waits until the elapse of the predetermined time period 2. On the other hand, when the CPU 51 has determined that the predetermined time period 2 has elapsed (step S36: YES), the CPU 51 proceeds with the step S41.

On the other hand, when the CPU 51 has determined that the detected signal is not the alarm signal (step S35: NO), the CPU 51 determines whether or not the CPU 51 has detected a dialogue signal which indicates a maintenance of the vehicle, etc. in accordance with the signal received by the CAN communication section 55 (step S37). When the CPU 51 has determined that the detected signal is the dialogue signal which indicates the maintenance of the vehicle, etc. (step S37: YES), the CPU 51 determines whether or not a predetermined time period 3 (twenty seconds, for example) has elapsed (step S38).

When the CPU 51 has determined that the predetermined time period 3 has not elapsed (step S38: NO), the CPU 51 waits until the elapse of the predetermined time period 3. On the other hand, when the CPU 51 has determined that the predetermined time period 3 has elapsed (step S38: YES), the CPU 51 proceeds with the step S41.

On the other hand, when the CPU 51 has determined that the detected signal is not the dialogue signal (step S37: NO), the CPU 51 determines whether or not the CPU 51 has detected a notice signal which indicates information of the vehicle, etc. in accordance with the signal received by the CAN communication section 55 (step S39). When the CPU 51 has determined that the detected signal is not the notice signal (step S39: NO), the CPU 51 ends the information-image enlarging process.

On the other hand, when the CPU 51 has determined that the detected signal is the notice signal which indicates the information of the vehicle, etc. (step S39: YES), the CPU 51 determines whether or not a predetermined time period 4 (ten seconds, for example) has elapsed (step S40). When the CPU 51 has determined that the predetermined time period 4 has not elapsed (step S40: NO), the CPU 51 waits until the elapse of the predetermined time period 4. On the other hand, when the CPU 51 has determined that the predetermined time period 4 has elapsed (step S40: YES), the CPU 51 proceeds with the step S41.

The CPU 51 normally displays the information-image when determined that the predetermined time period 1 has elapsed (step S34: YES), when determined that the predetermined time period 2 has elapsed (step S36: YES), when determined that the predetermined time period 3 has elapsed (step S38: YES), or when determined that the predetermined time period 4 has elapsed (step S40: YES). That is, as shown in FIG. 7C and FIG. 8C, the CPU 51 reads the text image data and the master caution symbol image data which are enlarged on the information-image display region 31 of the second display 30, and displays text images 70*c* and 70*f*, and the master caution symbol 42*a* in a normal size (a size before enlargement). When the information-image is to be displayed normally, it may be displayed while gradually decreasing the shrinking factor. When this process ends, the CPU 51 ends the information-image enlarging process.

In this way, different enlargement time are associated with the alert signal, the alarm signal, the dialogue signal, and the notice signal, respectively. Then, the information-image is being enlarged until the expiration of the enlargement time corresponding to the detected signal.

It may be configured so that the time for normally displaying the information-image is defined so that display times, which differ from one another, are associated with the alert signal, the alarm signal, the dialogue signal, and the notice signal, respectively, and the display of the information-image (the alert signal, the alarm signal, the dialogue signal, or the notice signal) is ended after the expiration of the display time corresponding to the detected signal, and then an image (for example, a rear image of the vehicle picked up by a camera, or a navigation image which indicates a route from the present location of the vehicle to the destination) selected by the driver or the like is displayed.

In this case, by displaying the alert image and the alarm image for a relatively-longer time than the dialogue image and the notice image, it is possible to cause the driver to understand the content of the alert and the alarm which have a high priority, displayed on the information-image display region 31.

FIG. 7 describes a case where only the text image 70 is enlarged for a predetermined time. Alternatively, the indicator symbol (not shown in figures) and the information symbol 43 (see FIG. 2) may be enlarged for the predetermined time in addition to the text image 70.

FIG. 8 describes a case where the master caution symbol 42 is enlarged for a predetermined time. The alert symbol 40 or the alarm symbol 41 may be enlarged for the predetermined time in addition to the text image 70. Further, it may be configured so that the master caution symbol is enlarged for the predetermined time before the alert symbol 40 or the alarm symbol 41 is displayed in a normal size.

In this way, when the information-image displayed on the second display 30 is to be switched, the information-image is enlarged for a predetermined time, and the change in the information-image enters the driver's sight. Thus, the driver can find the switch of the information-image to be displayed on the second display 30.

Further, the driver's eye can be guided to the information-image display region 31 by enlarging the alert image and the alarm image for a relatively-longer time than the dialogue image and the notice image. Thus, the driver can surely understand the content of the alert and the alarm which have a high priority, displayed on the information-image display region 31.

Moreover, it may be configured so that, by displaying the alert image and the alarm image in a more increased enlargement ratio than the dialogue image and the notice image relatively, the driver's eye is likely guided to the information-image display region 31 when the alert image or the alarm image is displayed.

Figure 9:
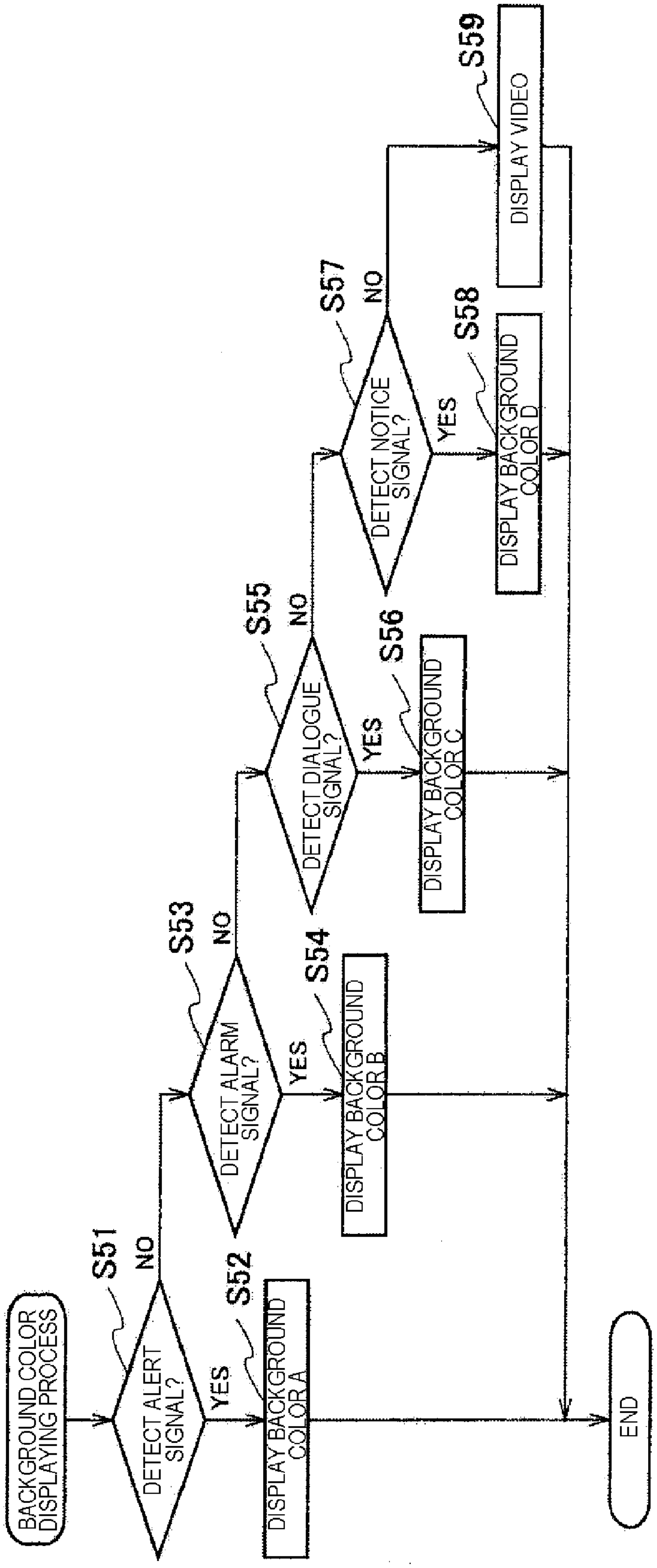
FIG. 9 is a flowchart of a background color displaying process according to the embodiment of the invention.
Figure 10A:
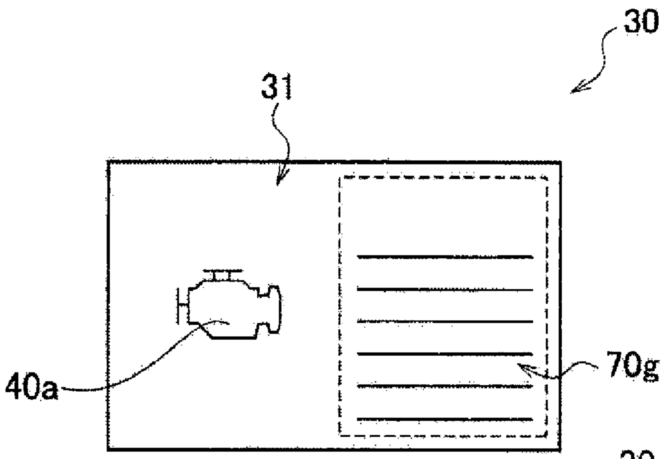
FIGS. 10A to 10D show information images to be displayed on the second display 30 according to the embodiment of the invention.
Figure 10B:
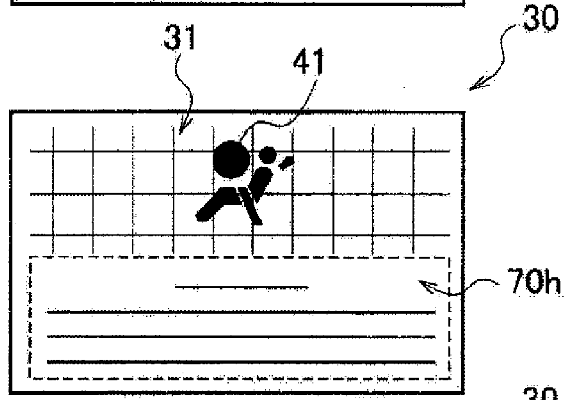
Figure 10C:
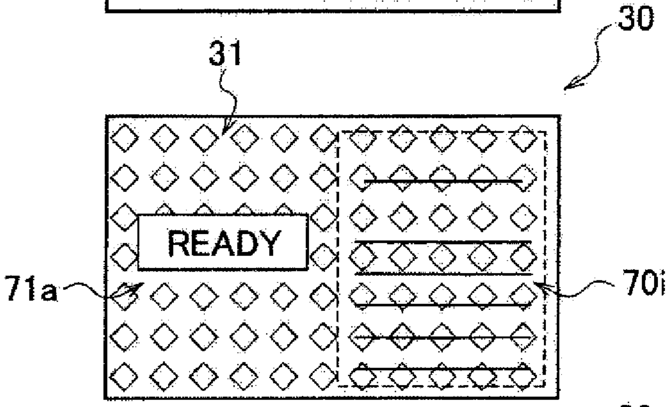
Figure 10D:
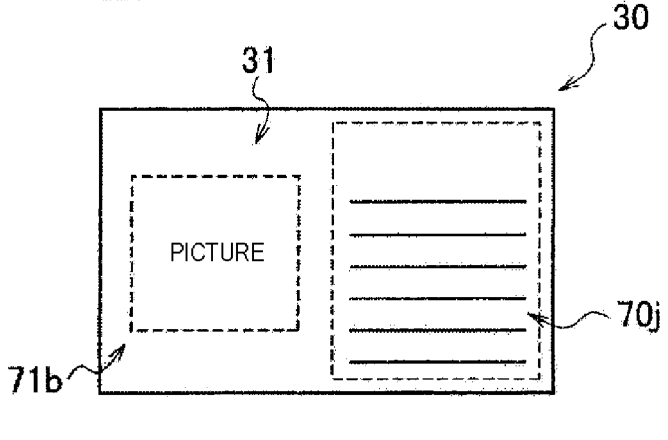

Next, a description is made of a background color displaying process of the CPU 51 according to the embodiment of the invention with reference to FIG. 9 and FIGS. 10A through 10D. FIG. 9 is a flowchart of the background color displaying process according to the embodiment of the invention. FIG. 10A is a diagram for showing an alert screen displayed on the second display 30 according to the embodiment of the invention. FIG. 10B is a diagram for showing an alarm screen displayed on the second display 30 according to the embodiment of the invention. FIG. 10C is a diagram for showing a dialogue screen displayed on the second display 30 according to the embodiment of the invention. FIG. 10D is a diagram for showing an information screen displayed on the second display 30 according to the embodiment of the invention.

First, as shown in FIG. 9, the CPU 51 determines whether or not the CPU 51 has detected an alert signal which indicates an abnormality of the vehicle in accordance with the signal received by the CAN communication section 55 (step S51). When the CPU 51 has determined that the detected signal is the alert signal which indicates the abnormality of the vehicle (step S51: YES), the CPU 51 displays a background of the information-image display region 31 of the second display 30 in a background color A (step S52). That is, as shown in FIG. 10A, when the detected signal is the alert signal which indicates the abnormality of the vehicle, the CPU 51 displays the background for the alert image in the background color A (a red color, for example) corresponding to the detected alert signal. When this process ends, the CPU 51 ends the background color displaying process.

On the other hand, when the CPU 51 has determined that the detected signal is not the alert signal (step S51: NO), the CPU 51 determines whether or not the CPU 51 has detected an alarm signal which indicates an abnormality of the vehicle in accordance with the signal received by the CAN communication section 55 (step S53). When the CPU 51 has determined that the detected signal is the alarm signal which indicates the abnormality of the vehicle (step S53: YES), the CPU 51 displays a background of the information-image display region 31 of the second display 30 in a background color B (step S54). That is, as shown in FIG. 10B, when the detected signal is the alarm signal which indicates the abnormality of the vehicle, the CPU 51 displays the background for the alarm image in the background color B (an orange color, for example) corresponding to the detected alarm signal. When this process ends, the CPU 51 ends the background color displaying process.

On the other hand, when the CPU 51 has determined that the detected signal is not the alarm signal (step S53: NO), the CPU 51 determines whether or not the CPU 51 has detected a dialogue signal which indicates a maintenance of the vehicle, etc. in accordance with the signal received by the CAN communication section 55 (step S55). When the CPU 51 has determined that the detected signal is the dialogue signal which indicates the maintenance of the vehicle, etc. (step S55: YES), the CPU 51 displays a background of the information-image display region 31 of the second display 30 in a background color C (step S56). That is, as shown in FIG. 10C, when the detected signal is the dialogue signal which indicates the maintenance of the vehicle, the CPU 51 displays the background for the dialogue image in the background color C (a green color, for example) corresponding to the detected dialogue signal. When this process ends, the CPU 51 ends the background color displaying process.

On the other hand, when the CPU 51 has determined that the detected signal is not the dialogue signal (step S55: NO), the CPU 51 determines whether or not the CPU 51 has detected a notice signal which indicates information of the vehicle, etc. in accordance with the signal received by the CAN communication section 55 (step S57). When the CPU 51 has determined that the detected signal is the notice signal which indicates the information of the vehicle, etc. (step S57: YES), the CPU 51 displays a background of the information-image display region 31 of the second display 30 in a background color D (step S58). That is, as shown in FIG. 10D, when the detected signal is the notice signal which indicates the information of the vehicle, the CPU 51 displays the background for the dialogue image in the background color D (a blue color, for example) corresponding to the detected notice signal. When this process ends, the CPU 51 ends the background color displaying process.

On the other hand, when the CPU 51 has determined that the detected signal is not the notice signal (step S57: NO), the CPU 51 displays an external image or the like on the information-image display region 31 of the second display 30 (step S59). That is, in a case where none of the alert image, the alarm image, the dialogue image and the notice image is displayed, an image selected by the driver, etc. such as a rear image of the vehicle or the navigation information image is displayed. When this process ends, the CPU 51 ends the background color displaying process.

As shown in FIGS. 10A through 10D, when the alert image is to be displayed, the alert symbol 40*a* corresponding to the alert symbol 40 displayed on the alert and alarm display section 15 of the first display 10 (see FIG. 2) and an text image 70*g* which indicates a detail of the alert are displayed. When the alarm image is to be displayed, the alarm symbol 41*a* corresponding to the alarm symbol 41 displayed on the alert and alarm display section 15 of the first display 10 and an text image 70*h* which indicates a detail of the alarm are displayed.

Further, when the dialogue image which indicates the maintenance of the vehicle, etc. is to be displayed, an image 71*a* corresponding to the indicator symbol (not shown in figures) displayed on the indicator and information display section 17 of the first display 10 (see FIG. 2) and an text image 70*i* which indicates a detail of the maintenance, etc. are displayed. When the notice image which indicates the information of the vehicle, etc. is to be displayed, an image 71*b* corresponding to the information symbol 43 displayed on the indicator and information display section 17 of the first display 10 and an text image 70*j* which indicates a detail of the information are displayed.

In this way, background colors, which differ from one another, are associated with the alert signal, the alarm signal, the dialogue signal, and the notice signal, respectively, and the background for the information-image is displayed in a background color corresponding to the detected signal. That is, when the alert symbol 40, the alarm symbol 41 or the information symbol 43 is displayed on the first display 10, the background for the information-image of the second display 30 is displayed in a background color corresponding to the symbol 40, 41, or 43. Thus, the information-image and the symbols 40, 41, 43 can be uniformed.

The driver can understand the kind of the information-image by the background color for the information-image which has entered the driver's sight without directly viewing the second display 30. Thus, the driver does not have to move his/her eye during the driving operation, and then the safety during the driving operation is improved.

Figure 11:
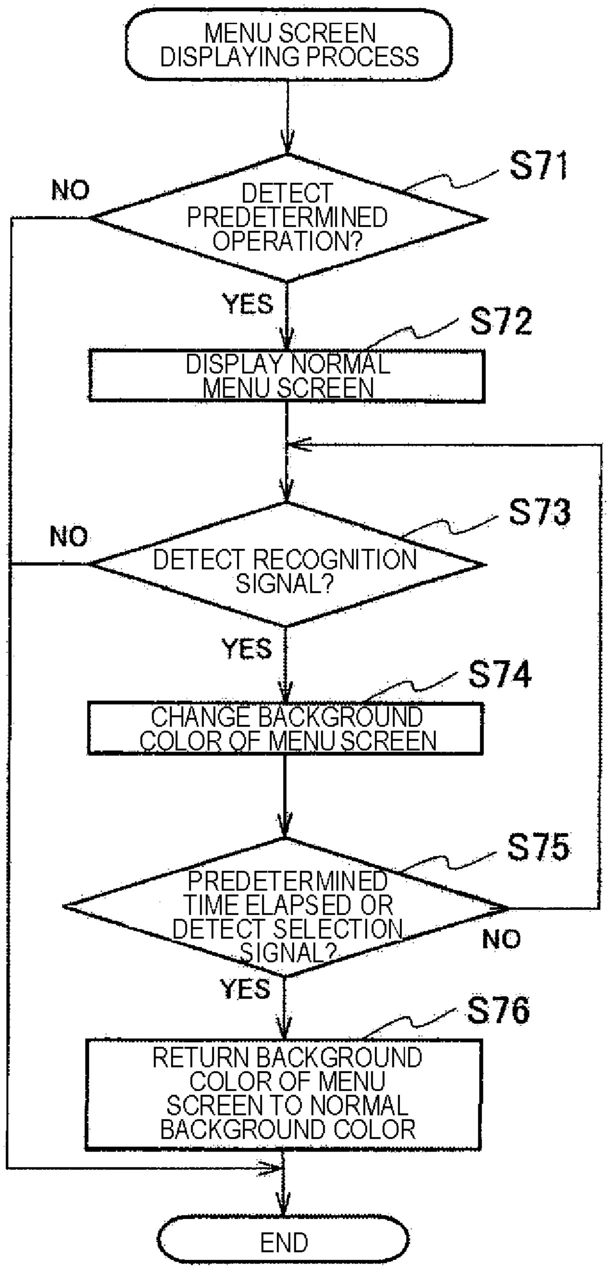
FIG. 11 is a flowchart of a menu screen displaying process according to the embodiment of the invention.
Figures 12A, 12B, 12C, 12D:
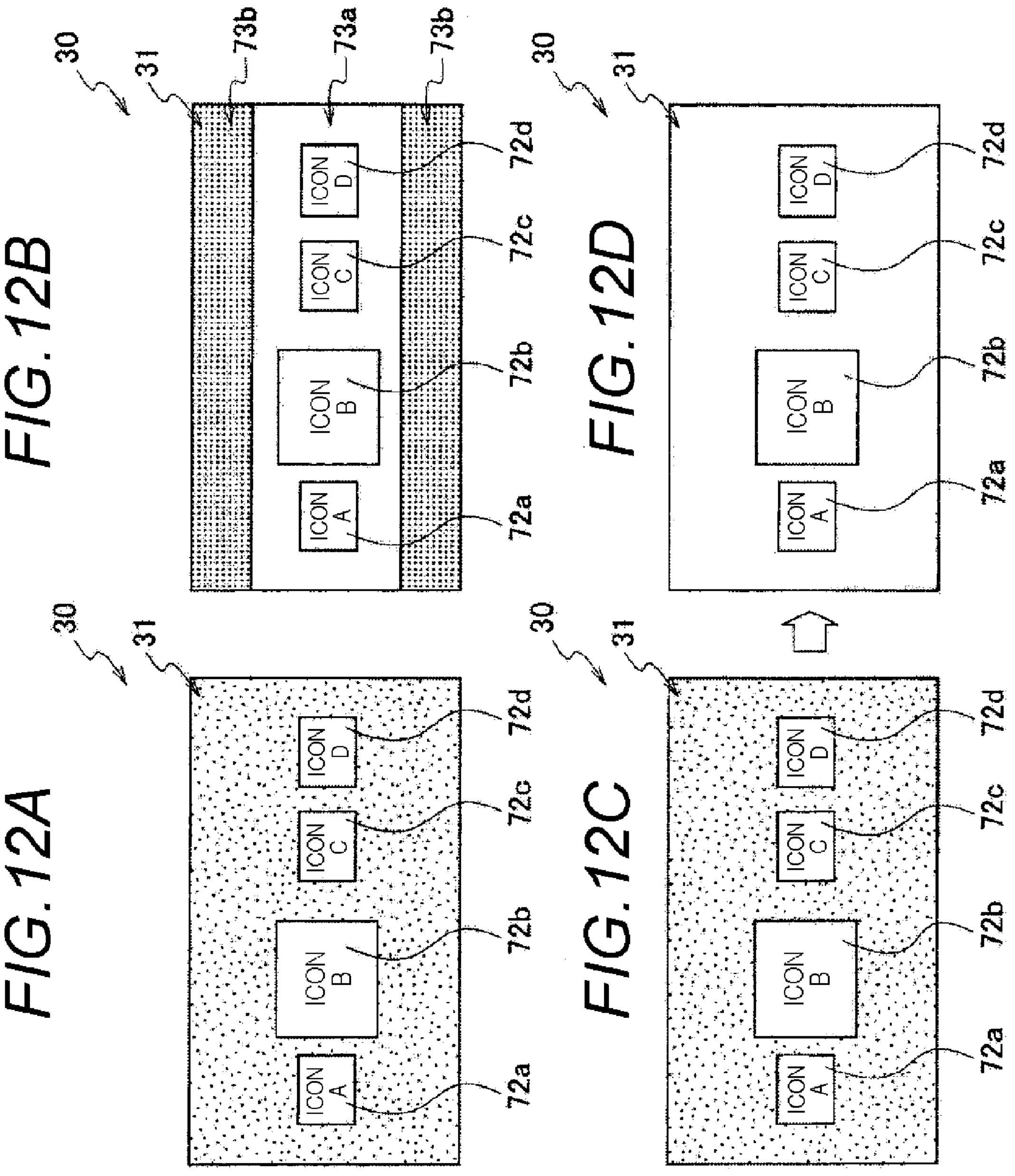
FIGS. 12A to 12D show a menu screen which is displayed on the second display 30 according to the embodiment of the invention.

Next, a description is made of a menu screen displaying process of the CPU 51 according to the embodiment of the invention with reference to FIG. 11 and FIGS. 12A through 12D. FIG. 11 is a flowchart of the menu screen displaying process according to the embodiment of the invention. FIG. 12A is a diagram showing a screen in which entire background of the menu screen is switched according to the embodiment of the invention. FIG. 12B is a diagram showing a screen in which a part of background of the menu screen is switched according to the embodiment of the invention. FIG. 12C is a diagram showing a screen just after the background of the menu screen is switched according to the embodiment of the invention. FIG. 12D is a diagram showing a screen after the background of the menu screen is switched according to the embodiment of the invention.

First, as shown in FIG. 11, the CPU 51 determines whether or not the CPU 51 has detected a predetermined operation such as an operation of a menu switch (not shown in figures) of a steering switch (not shown in figures) (step S71). That is, the CPU 51 determines whether or not the CPU 51 has detected an operation for displaying the menu screen.

Next, the CPU 51 displays a normal menu screen (step S72). The menu screen is a screen for displaying any one of various images such as a rear image of the vehicle and a navigation information image on the second display 30 or selecting by the driver or the like, when none of the alert image, the alarm image, the dialogue image, and the notice image is displayed. The menu screen displays icon images 72*a* to 72*d* for selecting by the driver one or more menus from a plurality of menus (such as an operation item for selecting which image of the various images is to be displayed) (see FIGS. 12A to 12D).

Next, the CPU 51 determines whether or not the CPU 51 has detected a recognition signal (step S73). That is, the CPU 51 determines whether or not the CPU 51 has recognized one of the icon images 72*a* to 72*d* by operating a cursor key (not shown in figures) of the steering switch by the driver, etc.

When the CPU 51 has determined that the CPU 51 has not received the recognition signal within a predetermined time (step S73: NO), the CPU 51 ends the menu screen displaying process. On the other hand, when the CPU 51 has determined that the CPU 51 has detected the recognition signal (step S73: YES), the CPU 51 changes a background color (a background color of the icon images 72*a* to 72*d*) of the menu screen (step S74). That is, display colors, which differ from one another, are associated with the icon images, respectively (a yellow color, a green color, an aqua color, and a pink color, for instance). As shown in FIG. 12A, when the CPU 51 has recognized the icon image 72*b*, the background of the menu screen (the background of the icon images 72*a* to 72*d*) is displayed in a display color (a green color, for example) corresponding to the icon image 72*b*, being changed from a normal background color (a black color, for example). Further, the recognized icon image 72*b* is displayed in a larger size than the other icon images 72*a*, 72*c*, 72*d*.

As shown in FIG. 12B, the change in the background color of the second display 30 may be modified so as to change a part of the background. When a part (50% or more of the total) of the background is changed, for example, a central region 73*a* displaying the icon images 72*a* to 72*d* is displayed in a white color, and end regions 73*b* not displaying the icon images 72*a* to 72*d* are displayed in a background color (a green color, for example) corresponding to the icon image 72*b*.

Next, the CPU 51 determines whether or not a predetermined time has elapsed, or the CPU 51 has detected a selection signal (step S75). That is, the CPU 51 counts a time from changing the background of the menu screen by a timer (not shown in figures), and determines whether or not the predetermined time has elapsed. Further, the CPU 51 determines whether or not the driver, etc. has selected the one of the icon images 72*a* to 72*d* recognized in the step S73 by a selection key (not shown in figures) of the steering switch.

When the CPU 51 has determined that the predetermined time has not elapsed and the CPU 51 has not detected the selection signal (step S75: NO), the CPU 51 proceeds with the step S73. That is, within the predetermined time and while the selection signal is not detected, the icon images 72*a* to 72*d* instead of the one of the icon images 72*a* to 72*d* which are detected in the step S73 can be recognized. On the other hand, when the CPU 51 has determined that the predetermined time has elapsed or the CPU 51 has detected the selection signal (step S75: YES), the CPU 51 returns the background color of the menu screen to the normal color (a black color, for example) as shown in FIG. 12C and FIG. 12D (step S76). When this process ends, any image of the various images such as a rear image of the vehicle and the navigation information image, which is selected by the driver, etc. is displayed on the second display 30, and the CPU 51 ends the menu screen displaying process.

In FIG. 11 and FIGS. 12A to 12D, a case is described where any one of the various images such as the rear image of the vehicle and the navigation information image is displayed or selected via the menu screen when none of the alert image, the alarm image, the dialogue image and the notice image is displayed. Alternatively, it may be configured so that any one of the various images such as the rear image of the vehicle and the navigation information image is displayed or selected via the menu screen when neither the alert image nor the alarm image, which have a relatively-high importance, is displayed.

In FIG. 11 and FIGS. 12A to 12D, a case is described where the background of the menu screen is displayed in a display color corresponding to one of the icon images 72*a* to 72*d* when the one of the icon images 72*a* to 72*d* is recognized. In addition, it may be configured so that, when one of the icon images 72*a* to 72*d* is recognized, the background is displayed, and also a recognition sound corresponding to the one of the icon images 72*a* to 72*d* is output to a speaker (not shown in figures).

In FIG. 11, a case is described where the one of the icon images 72*a* to 72*d* is recognized by operating a cursor key (not shown in figures) of the steering switch, and the one of the icon images 72*a* to 72*d* is selected by a selection key (not shown in figures). Alternatively, it may be configured so that the one of the icon images 72*a* to 72*d* is recognized or selected by operating a touch screen (not shown in figures) provided in the second display 30 by the driver, etc.

In this way, since the menu screen (the background of the icon images 72*a* to 72*d*) is displayed in the display color corresponding to the recognized one of the icon images 72*a* to 72*d*, the driver can understand the kind of the menu which the driver, etc. recognizes with the background color of the menu screen which enters the driver's sight without directly viewing the menu screen. Thus, the driver, etc. does not have to directly view the menu screen many times before selecting the objective menu. Accordingly, the safety during the driving can be enhanced.

Figure 13:
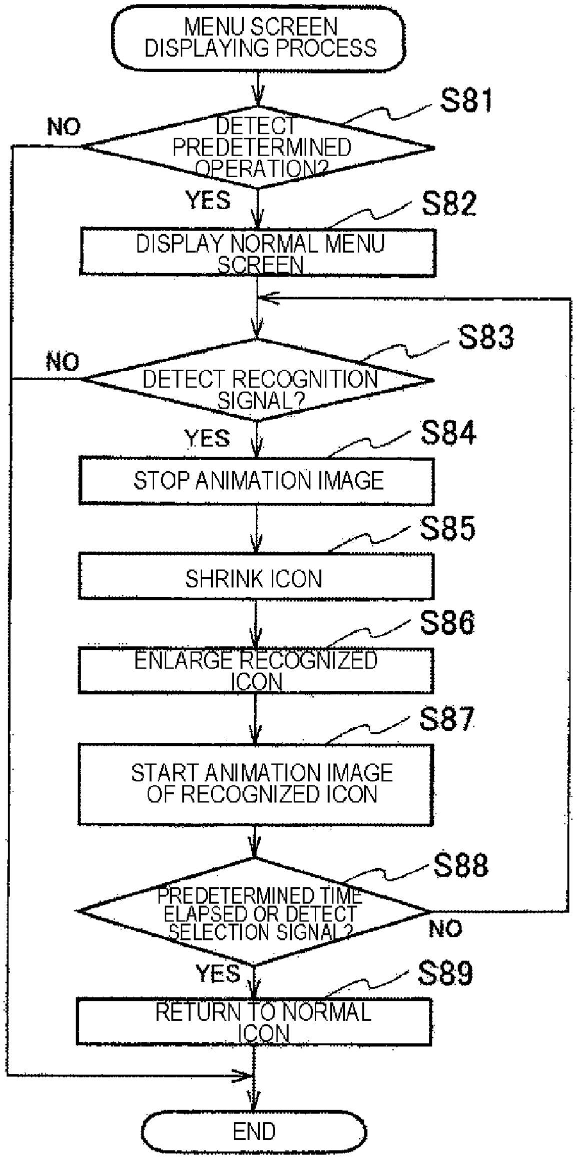
FIG. 13 is a flowchart of a menu screen displaying process according to another embodiment of the invention.
Figure 14A:
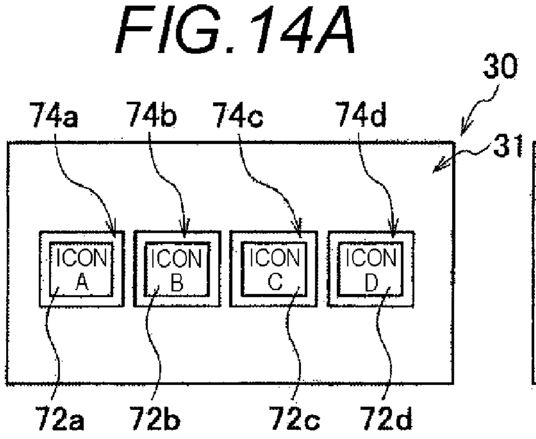
FIGS. 14A and 14B show a menu screen which is displayed on a second display 30 according to the other embodiment of the invention.
Figure 14B:
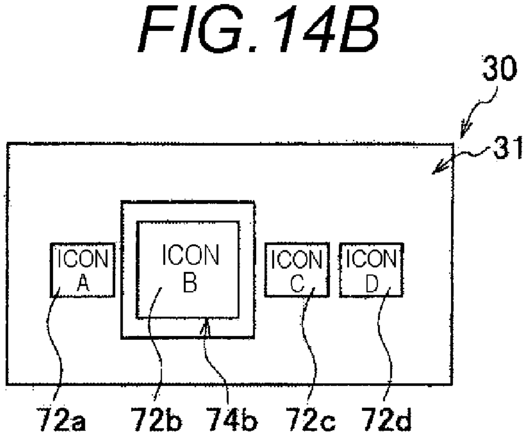
Figures 15A, 15B, 15C:
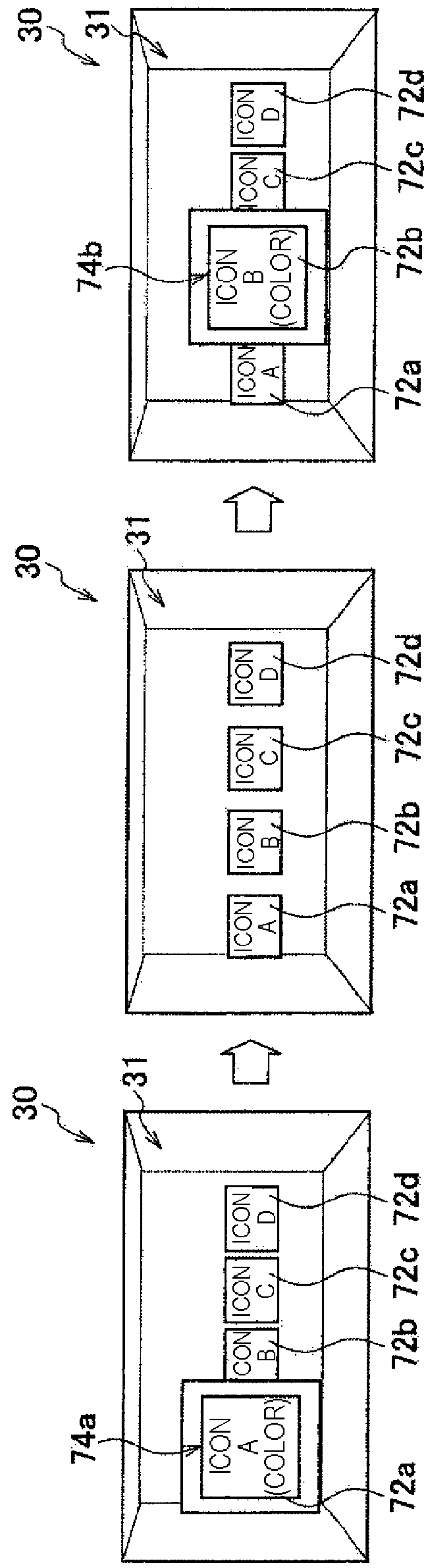
FIGS. 15A to 15C show a menu screen which is displayed on the second display 30 according to the other embodiment of the invention.

Next, a description is made of a menu screen display process of the CPU 51 according to another embodiment of the invention with reference to FIG. 13 to FIG. 15C. FIG. 13 is a flowchart of a menu screen displaying process according to the other embodiment of the invention. FIG. 14A shows a menu screen according to the other embodiment of the invention. FIG. 14B shows a menu screen when an icon image is recognized according to the other embodiment of the invention. FIG. 15A shows a menu screen when an icon image is recognized according to the other embodiment of the invention. FIG. 15B shows a menu screen after the icon image is recognized according to the other embodiment of the invention. FIG. 15C shows an animation display screen of the menu screen according to the other embodiment of the invention.

First, as shown in FIG. 13, the CPU 51 determines whether or not the CPU 51 has detected a predetermined operation (step S81). Specifically, the CPU 51 determines whether or not the CPU 51 has detected an operation of a menu switch (not shown in figures) of the steering switch.

Next, the CPU 51 displays a normal menu screen (step S82). The menu screen is a screen for displaying any one of various images such as a rear image of the vehicle and a navigation information image on the second display 30 or selecting by the driver or the like, when none of the alert image, the alarm image, the dialogue image, and the notice image is displayed. The menu screen displays icon images 72*a* to 72*d* for selecting by the driver one menu from a plurality of menus (such as an operation item for selecting which image of the various images is to be displayed) (see FIGS. 14A and 15A).

As shown in FIGS. 14A and 15A, in the periphery of the icon images 72*a* to 72*d*, animation display regions 74*a* to 74*d* for displaying an animation of moving pictures are disposed. Each of the animation display regions 72*a* to 72*d* displays respective animations which differ from each other.

Next, the CPU 51 determines whether or not the CPU 51 has detected a recognition signal (step S83). That is, the CPU 51 determines whether or not the CPU 51 has recognized one of the icon images 72*a* to 72*d* by operating a cursor key (not shown in figures) of the steering switch by the driver, etc.

When the CPU 51 has determined that the CPU 51 has not received the recognition signal within a predetermined time (step S83: NO), the CPU 51 ends the menu screen displaying process. On the other hand, when the CPU 51 has determined that the CPU 51 has detected the recognition signal (step S83: YES), the CPU 51 stops the animation images displayed on the animation display regions 74*a* to 74*d* (step S84). That is, the animation images are stopped by undisplaying the animation display regions 74*a* to 74*d* (see FIG. 15B).

Next, the CPU 51 shrinks the icon images 72*a* to 72*d* (step S85). Then, the CPU 51 enlarges and displays the recognized one of the icon images 72*a* to 72*d* (step S86), and displays an animation image on the corresponding one of the animation display regions 74*a* to 74*d* of the recognized one of the icon images 72*a* to 72*d* (step S87). For example, when the driver, etc. operates a cursor key (not shown in figures) of the steering switch, and the CPU 51 recognizes one icon image 72*b*, the CPU 51 stops the animation images displayed on the animation display regions 74*a* to 74*d* and shrinks the icon image 72*a* (see FIG. 15B). Then, the CPU 51 enlarges the recognized icon image 72*b* and displays the animation image corresponding to the icon image 72*b* on the animation display region 74*b* (see FIGS. 14B and 15C).

That is, the icon images 72*a* to 72*d* are associated with animation images, which differ from each other. When the CPU 51 has recognized one of the icon images 72*a* to 72*d*, the CPU 51 displays the animation image corresponding to the recognized one of the icon images 72*a* to 72*d* on the corresponding one of the animation display regions 74*a* to 74*d*.

Next, the CPU 51 determines whether or not a predetermined time has elapsed, or the CPU 51 has detected a selection signal (step S88). That is, the CPU 51 counts a time from displaying the image corresponding to the recognized one of the icon images 72*a* to 72*d* on the corresponding one of the animation display regions 74*a* to 74*d* by a timer (not shown in figures), and determines whether or not the predetermined time has elapsed. Further, the CPU 51 determines whether or not the driver, etc. has selected the one of the icon images 72*a* to 72*d* recognized in the step S83 by a selection key (not shown in figures) of the steering switch.

When the CPU 51 has determined that the predetermined time has not elapsed and the CPU 51 has not detected the selection signal (step S88: NO), the CPU 51 proceeds with the step S83. On the other hand, when the CPU 51 has determined that the predetermined time has elapsed or the CPU 51 has detected the selection signal (step S88: YES), the CPU 51 returns the selected one of the icon images 72*a* to 72*d* to the normal icon image (step S89). That is, the CPU 51 displays the normal menu screen (see FIG. 14A). When this process ends, any image of the various images such as a rear image of the vehicle and the navigation information image, which is selected by the driver, etc. is displayed on the second display 30, and the CPU 51 ends the menu screen displaying process.

As shown in FIGS. 15A through 15C, the second display 30 may be configured to display the background of the icon images 72*a* to 72*d* in three dimensions. When the CPU 51 has recognized the icon image 72*a* as shown in FIG. 15A, the CPU 51 stops (undisplays) the animation of the icon images 72*a* to 72*d* displayed on the animation display regions 74*a* to 74*d* as shown in FIG. 15B. Then, when the CPU 51 has recognized the icon image 72*b*, the CPU 51 displays the animation on the animation display region 74*b* and also enlarges the icon image 72*b* as shown in FIG. 15C. Since the background of the icon image 72*b* is displayed in three dimensions, when the recognized icon image 72*b* is enlarged, the icon image 72*b* is displayed as if it moves toward the driver. Thus, the icon image 72*b* can be displayed with an emphasis.

In FIG. 13 to FIG. 15C, a case is described where any one of the various images such as the rear image of the vehicle and the navigation information image is displayed or selected via the menu screen when none of the alert image, the alarm image, the dialogue image and the notice image is displayed. Alternatively, it may be configured so that any one of the various images such as the rear image of the vehicle and the navigation information image is displayed or selected via the menu screen when neither the alert image nor the alarm image, which have a relatively-high importance, is displayed.

In FIG. 13 to FIG. 15C, a case is described where the animation image corresponding to the recognized one of the icon images 72*a* to 72*d* is displayed on the corresponding one of the animation image regions 74*a* to 74*d* when one of the icon images 72*a* to 72*d* is recognized. In addition, it may be configured so that, when one of the icon images 72*a* to 72*d* is recognized, the animation image is displayed, and also a recognition sound corresponding to the one of the icon images 72*a* to 72*d* is output to a speaker (not shown in figures).

In this way, since the selected one of the icon images 72*a* to 72*d* is enlarged, and the animation is displayed on the corresponding one of the animation display regions 74*a* to 74*d*, the driver can understand the kind of the menu which the driver, etc. recognizes with the background color of the menu screen which enters the driver's sight without directly viewing the menu screen. Thus, the driver, etc. does not have to directly view the menu screen many times before selecting the objective menu. Accordingly, the safety during the driving can be enhanced.

In this way, a display apparatus 1 for vehicle according to the embodiment of the invention includes: a first display 10 which is provided in a region A within a horizontal width of a steering wheel 90 when viewed from a driver, and which displays at least single piece of notification information (such as the alert symbol 40, the alarm symbol 41, the master caution symbol 42, the indicator symbol (not shown in figures), or the information symbol 43 which indicate the alert, the suggestion, the vehicle information, or the dialogue detail) regarding a state of the vehicle; a second display 30 which is integrally formed with the first display 10, and which displays information in a region B outside the horizontal width of the steering wheel 90 when viewed from the driver; and a CPU 51 which controls image-display on the first display 10 and the second display 30. The second display 30 includes an information-image display region 31 which displays an information-image (such as the alert image, the alarm image, the dialogue image, or the notice image) corresponding to the at least single piece of notification information, and a guide display region 33 which displays a guide-image 32 for guiding a driver's eye to a side of the information-image display region 31.

In the display apparatus 1 for vehicle according to the embodiment of the invention, the guide display region 33 is located between the first display 10 and the information-image display region 31.

In the display apparatus 1 for vehicle according to the embodiment of the invention, the guide display region 33 has an elongated shape extending from a side of the first display 10 to a side of the information-image display region 31, and the CPU 51 lights the guide display region 33 when the CPU 51 causes the first display 10 to display the notification information.

In the display apparatus 1 for vehicle according to the embodiment of the invention, the CPU 51 of the control circuit 50 lights the guide display region 33 so as to gradually lengthen the lighting time of the guide display region 33 from a side of the first display 10 toward the information-image display region 31 when the CPU 51 causes the first display 10 to display the notification information.

In the display apparatus 1 for vehicle according to the embodiment of the invention, a plurality of pieces of notification information correspond to respective display colors, which differ from one another in color, and when the CPU 51 of the control circuit 50 causes the first display 10 to display one of the plurality of pieces of the notification information, the CPU 51 lights the guide display region 33 with a display color corresponding to the one notification information.

According to the display apparatus 1 for vehicle according to the embodiment of the invention, since the guide-image 32 for guiding the driver's eye toward the information-image display region 31 of the second display 30 is displayed, the driver's eye is guided to the information-image display region 31. Thus, it is possible to enhance the visibility of the information image (such as the alert image, the alarm image, the dialogue image, or the notice image) which corresponds to the notification information which has been displayed on the information-image display region 33.

Further, since the information-image display region 31 of the second display 30 displays the information image corresponding to the notification information (see FIG. 10), the driver's eye can be guided to the information-image display region 33. Thus, the driver can surely understand the content of the notification information displayed on the first display 10.

Accordingly, it is possible to provide a display apparatus 1 for vehicle capable of enhancing the visibility of the information-image regarding the notification information by guiding the driver's eye, and causing the driver to surely understand the content of the notification information.

Since the guide display region 33 is located between the first display 10 and the information-image display region 31, the guide display region 33 comes into the sight of the driver. Thus, it is possible to guide the driver's eye to the information-image display region 31.

When the notification image is displayed on the first display 10, the guide display region 33 having the elongated shape extending from a side of the first display 10 toward the information-image display region 31 is lightened. Thus, it is possible to guide the driver's eye more to the information-image display region 31.

The guide display region 33 is lightened so as to gradually lengthen the lighting time of the guide display region 33 from a side of the first display 10 toward the information-image display region 31. Thus, the driver's eye can be likely guided to the information-image display region 31.

When the notification image is displayed on the first display 10, the guide display region 33 is lightened in the display color corresponding to the displayed notification information. Thus, the guide display region 33 which lights in the display color corresponding to the notification information comes into the sight of the driver. The driver can understand the kind of the notification information and view the information-image.

The display apparatus for vehicle according to the aspect of the invention has been described in accordance with the embodiment with reference to the drawings. However, the invention is not limited thereto, and the constitution of each section can be replaced with any components which have similar functions.

For example, in the embodiment, a case is described where the information-image (such as the alert image, the alarm image, the dialogue image, or the notice image) is enlarged for a predetermined time in accordance with the alert signal, the alarm signal, the dialogue signal, or the notice signal. Alternatively, it may be configured so that the information-image (the alert image or the alarm image) is enlarged only if the alert signal or the alarm signal appears.

In the embodiment, a case is described where the background of the information-image display region 31 is displayed in a display color corresponding to the each signal in accordance with the alert signal, the alarm signal, the dialogue signal, or the notice signal. Alternatively, it may be configured so that the background of the information-image display region 31 is displayed in the display color corresponding to the alert signal or the alarm signal only if the alert signal or the alarm signal appears.

In the embodiment, a case is described where the guide display region 33 (see FIG. 2) is lighted in a display color corresponding to the notification information (the symbol 40, 41 or 43) displayed on the first display 10. Alternatively, it may be configured so that the guide display region 33 is lighted in a case of the alert symbol 40 or the alarm symbol 41, and the guide display region 33 blinks or blacks out in other cases. Alternatively, it may be configured so that the guide display region 33 blinks in the case of the alert or the alarm, and the guide display region 33 is lighted or blacks out in other cases.

In the embodiment, a case is described where the guide image 32 is displayed by lighting or blinking the guide lights 34 of the guide image display region 33 in a display color corresponding to the notification information (the symbol 40, 41 or 43). Alternatively, image data in the display color corresponding to the notification information may be generated and displayed.

In the embodiment, a case is described where the notification information (the symbol 40, 41 or 43) is displayed on the first display 30 in accordance with the alert signal, the alarm signal, the dialogue signal, or the notice signal which has been detected. Alternatively, it may be configured so that the indicator symbol and the information symbol 43 are not displayed on the first display 10 and the dialogue image and the notice image are displayed on the information-image display region 31 of the second display 30 when the detected signal is the dialogue signal or the notice signal.

Aspects of the present invention are extremely useful for enhancing the visibility of the information-image regarding the notification information.

What is claimed is:

1. A display apparatus for a vehicle, comprising:

a first display unit which is provided in a region within a horizontal width of a steering wheel when viewed from a driver, and which is configured to display a plurality of different notification symbols regarding a state of the vehicle;

a second display unit which is integrally formed with the first display unit, and which is configured to display information in a region outside the horizontal width of the steering wheel when viewed from the driver; and a control unit which is configured to control image-display on the first display unit and the second display unit, wherein the second display unit includes an information-image display region which is configured to display an information-image and a text image corresponding to one of the plurality of different notification symbols being displayed on the first display unit, and a guide display region which is configured to display a guide-image for guiding a driver's eye to a side of the information-image display region, wherein the guide display region is located between the first display unit and the information-image display region, the guide display region has a plurality of elongated guide lights which are aligned from a side of the first display unit to a side of the information-image display region, and the elongated guide lights become shorter in length from the side of the first display unit to the side of the information-image display region, and the control unit lights the guide display region when the control unit causes the first display unit to display the one of the plurality of different notification symbols.

2. The display apparatus according to claim 1, wherein the control unit lights the guide display region so as to gradually lengthen the lighting time of the guide display region from a side of the first display unit toward the information-image display region when the control unit causes the first display unit to display the one of the plurality of different notification symbols.

3. The display apparatus according to claim 1, wherein a plurality of pieces of notification information correspond to respective display colors, which differ from one another in color, and when the control unit causes the first display unit to display one of the plurality of pieces of notification information, the control unit lights the guide display region with a display color corresponding to the one of the plurality of pieces of notification information.

4. The display apparatus according to claim 1, wherein the information-image is a symbol and is the same as the one of the plurality of different notification symbols being displayed.

* * * * *